(12) United States Patent
Takada et al.

(10) Patent No.: US 8,137,788 B2
(45) Date of Patent: Mar. 20, 2012

(54) LAMINATED FILM

(75) Inventors: Yasushi Takada, Otsu (JP); Masato Yanagibashi, Otsu (JP); Masato Ushijima, Anpachi-gun (JP); Yutaka Harada, Anpachi-gun (JP)

(73) Assignee: Toray Industries, Inc. (JP)

( * ) Notice: Subject to any disclaimer, the term of this patent is extended or adjusted under 35 U.S.C. 154(b) by 1363 days.

(21) Appl. No.: 11/663,948

(22) PCT Filed: Sep. 26, 2005

(86) PCT No.: PCT/JP2005/017572
§ 371 (c)(1),
(2), (4) Date: Mar. 27, 2007

(87) PCT Pub. No.: WO2006/035684
PCT Pub. Date: Apr. 6, 2006

(65) Prior Publication Data
US 2007/0202297 A1 Aug. 30, 2007

(30) Foreign Application Priority Data

Sep. 29, 2004 (JP) .................................. 2004-283762
May 24, 2005 (JP) .................................. 2005-150634

(51) Int. Cl.
B32B 7/02 (2006.01)
B32B 27/08 (2006.01)
B32B 27/18 (2006.01)
B32B 27/26 (2006.01)
B32B 27/28 (2006.01)

(52) U.S. Cl. ........ 428/141; 428/332; 428/336; 428/339; 428/343; 428/423.1; 428/423.7; 428/480; 428/483; 428/500; 428/522; 525/186; 525/189

(58) Field of Classification Search .................. None
See application file for complete search history.

(56) References Cited

U.S. PATENT DOCUMENTS

| 4,164,459 A * | 8/1979 | Noomen et al. ............... 522/16 |
| 4,299,748 A * | 11/1981 | Hashizume et al. .......... 524/519 |
| 5,391,472 A | 2/1995 | Muys et al. |
| 6,004,483 A * | 12/1999 | Jonas et al. .................... 252/500 |
| 6,013,733 A * | 1/2000 | Singer et al. .................. 525/208 |
| 6,429,248 B2 * | 8/2002 | Schwark et al. ............... 524/315 |
| 6,542,292 B2 * | 4/2003 | Onomichi et al. ............. 359/350 |
| 6,765,078 B2 * | 7/2004 | Husemann et al. ............ 526/319 |
| 7,022,388 B2 * | 4/2006 | Hashimoto et al. ............ 428/34.9 |
| 7,427,371 B2 * | 9/2008 | Kawanishi et al. ............ 264/2.5 |
| 7,434,500 B2 * | 10/2008 | Dale' et al. ........................ 83/52 |
| 7,527,753 B2 * | 5/2009 | Hiroshige et al. .......... 252/518.1 |
| 7,534,500 B2 * | 5/2009 | Kobayashi et al. ............ 428/457 |
| 7,678,455 B2 * | 3/2010 | Takada et al. .................. 428/413 |
| 2001/0044492 A1 * | 11/2001 | Schwark et al. ............... 524/539 |
| 2003/0013050 A1 * | 1/2003 | Schwark et al. ............... 430/527 |
| 2003/0025106 A1 * | 2/2003 | Schwark et al. ............... 252/500 |
| 2004/0135126 A1 * | 7/2004 | Schwark et al. ............... 252/500 |
| 2005/0029496 A1 * | 2/2005 | Schwark et al. ............... 252/500 |
| 2005/0053801 A1 * | 3/2005 | Elschner et al. ............... 428/690 |
| 2005/0064198 A1 * | 3/2005 | Takada et al. ................ 428/411.1 |

FOREIGN PATENT DOCUMENTS

| EP | 0 602 713 A1 | 6/1994 |
| JP | 60-141525 A | 7/1985 |
| JP | 61-204240 A | 9/1986 |
| JP | 1-313521 A | 12/1989 |
| JP | 6-295016 A | 10/1994 |
| JP | 7-292081 A | 11/1995 |
| JP | 7-329250 A | 12/1995 |
| JP | 7-330901 A | 12/1995 |
| JP | 9-31222 A | 2/1997 |
| JP | 10-114039 A | 5/1998 |
| JP | 2000-6324 A | 1/2000 |
| JP | 2000-26817 A | 1/2000 |
| JP | 2002-79640 A | 3/2002 |
| JP | 2002-301787 A | 10/2002 |
| JP | 2003-137337 A | 5/2003 |
| JP | 2003-154616 | * 5/2003 |
| JP | 2003-154616 A | 5/2003 |
| JP | 2004-9362 A | 1/2004 |
| JP | 2004-058648 | * 2/2004 |
| JP | 2004-58648 A | 2/2004 |
| JP | 2004-181708 A | 7/2004 |
| WO | WO 03/102057 | * 12/2003 |

* cited by examiner

*Primary Examiner* — Vivian Chen
(74) *Attorney, Agent, or Firm* — DLA Piper LLP (US)

(57) ABSTRACT

A laminated film including a thermoplastic resin film and an laminated layer that is formed on at least one side of the thermoplastic resin film and comprises (A) a composition, (B) an epoxy crosslinking agent and (C) an acrylic resin having an alkyl chain of 18 to 25 carbon atoms is characterized in that the composition (A) is a composition containing at least a polythiophene and a polyanion and/or a composition containing a polythiophene derivative and a polyanion, the laminated layer contains 15 to 100 parts by weight of the acrylic resin (C) having an alkyl chain of 18 to 25 carbon atoms based on 100 parts by weight of the sum of the composition (A) and the crosslinking agent (B) and/or its reaction product, at least one side of the laminated film has a three-dimensional average surface roughness (SRa) of 3 to 50 nm, and the laminated film contains less than 10 internal contaminant particles with an average particle size of at least 100 μm per 1 $m^2$, so that it has high level of electrical conductivity, good releasability and water resistance, and also has oligomer precipitation-preventing properties during heating.

22 Claims, No Drawings

LAMINATED FILM

RELATED APPLICATION

This is a §371 of International Application No. PCT/JP2005/017572, with an international filing date of Sep. 26, 2005 (WO 2006/035684 A1, published Apr. 6, 2006), which is based on Japanese Patent Application Nos. 2004-283762, filed Sep. 29, 2004, and 2005-150634, filed May 24, 2005.

TECHNICAL FIELD

The technology herein relates to a laminated film and particularly relates to a laminated film having a laminated layer formed by coating. More specifically, this technology relates to a laminated film that can be used for surface protection in the working or implementation of polarizing plates and the like for liquid crystal televisions, car navigation displays, cellular phone liquid crystal displays, computer displays, a hot stamping foil process for performing direct thermal transfer to molded components, an in-mold transfer process for performing injection molding and transfer printing at the same time, a vacuum press transfer process including the steps of reducing the air pressure between a transfer foil and a molded component and then performing transfer printing by pressing and heating, and the like.

BACKGROUND

The changeover from so-called CRT televisions to liquid crystal displays is remarkable together with a display revolution in recent years. Concerning liquid crystal displays, the process of working and implementing an optical sheet for a certain essential component such as a polarizing plate includes applying a pressure-sensitive adhesive or the like to a transparent protective film for surface protection, such as a polyethylene film, a polypropylene film, or a polyester film (namely, a so-called surface protective film), for the purpose of bonding it to the component, and laminating them before use. After the laminate is incorporated into a liquid crystal display or the like, the protective film is peeled and removed. At the time of peeling, however, a so-called "separation electrification" phenomenon can occur, and thus there is a problem in which dust can be deposited due to the static electricity, or the attached component itself can be charged to catch dust. For example, the problem of the dust deposition is also a serious problem with a manufacturing process, because it is difficult to determine, at the time of product inspection, whether the problem is caused by a defect in a liquid crystal component itself or by the dust deposited on the surface and because inspection cannot be smoothly performed. In recent years, particularly high-definition displays suffer from not only the problem by dust deposition but also the problem of the breakdown of an electronic display element by separation electrification.

On the other hand, antistatic agent-blended polyethylene or polypropylene films have low transparency so that there is a problem in which the low transparency of the protective film can reduce inspection accuracy or make inspection slow when products are examined for defects after liquid crystal displays or the like are assembled.

Even in cases where highly transparent polyester films are used, untreated products have no antistatic properties and thus frequently cause troubles due to electrification, such as dust deposition. In order to solve the problem, antistatic agent-blended polyester films or antistatic agent-coated polyester films are investigated. For example, it is proposed that an ion-conductive antistatic agent should be used in combination with an acrylic resin or the like so that an antistatic layer with good transparency can be formed even when an in-line coating process is used, which includes coating, drying, stretching, and heat-treating in a film-forming process (Japanese Patent Application Laid-Open (JP-A) No. 61-204240).

Examples of the proposed products using electron-conductive antistatic agents include polyaniline-based antistatic agents (JP-A No. 07-330901), tin oxide-based anti-static agents (JP-A No. 07-329250), and polythiophene-based antistatic agents (JP-A No. 01-313521). Specifically, it is also proposed that a coating liquid containing en electron-conductive polythiophene-based antistatic agent and a latex polymer should be applied (JP-A No. 06-295016).

In the above-mentioned lamination process using a pressure-sensitive adhesive, an accidental deposition of the pressure-sensitive adhesive, particularly a deposition on the other surface of the laminated film, should be easily wiped off. Namely, so-called anti-fouling properties are required for the same reason as mentioned above, and the formation of a layer having antifouling properties, and the like are proposed (JP-A No. 2003-154616).

Next, a description is given of transfer foils.

Transfer foils are generally used in a process including the steps of laminating the subject to be transferred on the surface of the transfer foil used as a base material and transferring the subject to the desired product or the like as needed. Recently, with environmental awareness growing in these days, a new look has been taken particularly at such a process, for the purpose of forming figures or patterns with no organic solvent in the final process of manufacturing products, or the like.

For example, plastic or metallic products for use in home electric appliances, car components, house building materials, graphic products, security products, safety display-related products, and the like have been diversified in design, so that products whose surfaces have precision figures or patterns incomparable with conventional ones have been used. An in-mold transfer process, a vacuum press transfer process, a hot stamping foil process, and the like are used to print patterns on such plastic or metallic products. For example, the in-mold transfer process includes the steps of previously placing a transfer foil at a certain position in a die or mold and then press-injecting a resin into the mold from an injection molding machine so that molding and patterning from the transfer foil are performed at the same time. The vacuum press transfer process includes the steps of placing a transfer foil opposite to a molded product, reducing the air pressure between the transfer foil and the molded product such that the transfer foil comes into contact with the molded product surface, and pressing and heating them to form patterns from the transfer foil.

The market for Information Technology, flat panel displays, cellular phones, optical applications, and the like has been rapidly expanded. Under the circumstances, not only the conventional pattern transfer process, but also the process of imparting anti-scratch resistance by applying an organic solvent-containing hard-coating paint and UV-curing it, which is conventionally used when a final product is assembled, or the process of forming a hard coat layer and an adhesive layer on the transfer foil and using the laminate for transfer in product assembling, which is performed in a manufacturing process with waste disposal facilities, have been used in optical applications of very high quality, which has never been expected.

Thermoplastic resin films are preferably used as base films for these transfer foils. Particularly in terms of heat resistance and formability, polyester films are preferably used. In the basic structure of the transfer foil, a release layer, a pattern layer and an adhesive layer are formed in this order on one side of a polyester base film. The pattern layer may be formed on the whole surface or part of the surface.

There is disclosed a film for transfer foils, which includes a polyester film and a polyester resin-based coating formed on at least one side of the polyester film. However, this is for the purpose of improving the adhesion between the polyester base film and a release layer (JP-A No. 10-114039).

On the other hand, with an increase in manufacturing process speed, a discharge phenomenon or a spark is caused by separation electrification in an unwinding process, or with an increase in pattern precision, deposition of dust has been considered as an extremely undesirable matter. Thus, antistatic properties are required of transfer foils, and in recent years, the demand for such a function has become stronger, so that antistatic properties at low humidity or a conductivity level corresponding to $10^6$ Ω/□ or less can be required. For imparting antistatic properties, for example, there are disclosed a method of forming a coating of a polyester resin to which a low-molecular weight antistatic agent is added (JP-A No. 60-141525), a method of forming a coating of an antimony-doped tin oxide conductive agent which is a humidity-independent, electron-conductive-type antistatic agent (JP-A No. 07-329250), and a method of forming a coating of a polythiophene-based conductive agent which is an electron-conductive-type antistatic agent (JP-A No. 09-31222).

The above conventional techniques, however, have the problems as described below.

The above conventional techniques for imparting antistatic properties have problems in which when ion-conductive-type antistatic agents are used, their conducting mechanism depends on adsorption of water from the air by ions and thus they are necessarily humidity-dependent (in particular, the low-molecular weight type used is significantly humidity-dependent), so that no electrical conductivity can be produced in a low-humidity environment such as a winter season.

When electron conductive agents such as antimony-doped tin oxide-based anti-static agents and polythiophene-based antistatic agents are used in which conjugated electrons are used for the conducting mechanism, the humidity dependency as described above is absent, but the composition itself is rigid and thus has no stretch following capability, for example, when an in-line coating process is used in which coating, drying, stretching, and heat treatment are preformed in a film-forming process, so that a problem can occur in which the coating film can be cracked or whitened by stretching and can cause troubles at the time of the product inspection as mentioned above.

Only the antistatic agent coating technique cannot provide antifouling properties or releasability for the antistatic layer. As mentioned above, therefore, for example with respect to polarizing plate-protective films and the like, it is difficult to determine at the time of product inspection whether the trouble is caused by a defect in a liquid crystal component itself or by surface deposition of a pressure-sensitive adhesive, so that a serious problem with the manufacturing process, such as inhibition of smooth inspection, can occur.

The case where a film with a rough surface or a film having coarse projections is used also has a similar problem in which it is difficult to determine whether the defect-like matter is caused by a defect in a liquid crystal component itself or simply by a defect in the film, such as a projection-derived defect.

The transfer foil or the like can also cause a serious problem in which the surface of the polyester base film opposite to the pattern or adhesive layer side is blocked with the adhesive layer so that the film cannot be unwound from a roll. Thus, a so-called "release function layer" is necessary on the opposite side of the polyester base film to prevent the blocking event with the adhesive layer, which has become highly and strongly adhesive in recent years. However, products satisfying such requirements have not yet been obtained.

In applications for which the market has been rapidly expanded, such as Information Technology, flat panel display, cellular phone, and optics applications, the smoothness or glossiness of the surface of a component is very important after peeling, for example, in a case where an optical film used as a component of a laminate, a protective film therefore or the like is peeled from a transfer film before use. However, products satisfying anti-static properties and smoothness at high level have not yet been obtained.

SUMMARY

The laminated films are constituted as described below:
(1) A laminated film, including a thermoplastic resin film and an laminated layer that is formed on at least one side of the thermoplastic resin film and comprises a composition (A), an epoxy crosslinking agent (B) and an acrylic resin (C) having an alkyl chain of 18 to 25 carbon atoms, wherein
the composition (A) is a composition containing at least a polythiophene and a polyanion and/or a composition containing a polythiophene derivative and a polyanion,
the laminated layer contains 15 to 100 parts by weight of the acrylic resin (C) having an alkyl chain of 18 to 25 carbon atoms based on 100 parts by weight of the sum of the composition (A) and the crosslinking agent (B) and/or those reaction product,
at least one side of the laminated film has a three-dimensional average surface roughness (SRa) of 3 to 50 nm, and
the laminated film contains internal contaminant particles with an average particle size of at least 100 µm less than 10 per 1 m²;
(2) The laminated film according to Item (1), wherein the weight ratio of the solids of the sum of the epoxy crosslinking agent (B) and/or those reaction product to the solids of the composition (A) and the epoxy crosslinking agent (B) and/or those reaction product is from 50 to 95% by weight;
(3) The laminated film according to Item (1) or (2), wherein the laminated layer contains 15 to 40 parts by weight of the acrylic resin (C) having an alkyl chain of 18 to 25 carbon atoms based on 100 parts by weight of the sum of the composition (A) and the crosslinking agent (B) and/or those reaction product;
(4) The laminated film according to any one of Items (1) to (3), wherein the laminated film has a haze of at most 5%;
(5) The laminated film according to any one of Items (1) to (4), wherein the laminated film has a three-dimensional average surface roughness of 10 points (SRz) of at most 1000 nm;
(6) The laminated film according to any one of Items (1) to (5), wherein at least one side of the laminated film has a three-dimensional average surface roughness of 10 points (SRz) of at most 500 nm;
(7) The laminated film according to any one of Items (1) to (6), wherein the three-dimensional average surface roughness (SRa) is from 3 to 15 nm;
(8) The laminated film according to any one of Items (1) to (7), wherein the electrical conductivity of the laminated layer is from $1 \times 10^3$ Ω/□ to $1 \times 10^7$ Ω/□;
(9) The laminated film according to any one of Items (1) to (8), wherein with respect to variations in cross-sectional thickness measured in the transverse direction (TD) of the laminated film, the number of portions with a thickness variation of at least 0.3 μm is at most 5 per 1 m when the thickness variation is measured per 3 cm along the TD;

(10) The laminated film according to any one of Items (1) to (9), wherein it has deposited contaminant particles of at least 100 μm less than 10 per 1 m²;

(11) The laminated film according to any one of Items (1) to (10), wherein a titanium compound is used as a resin polymerization catalyst for the thermoplastic resin film;

(12) The laminated film according to any one of Items (1) to (11), wherein it is produced by simultaneous biaxial stretching;

(13) The laminated film according to any one of Items (1) to (12), further including a pressure-sensitive adhesive layer formed on at least one side of the laminated film;

(14) The laminated film according to any one of Items (1) to (13), further including a pressure-sensitive adhesive layer formed on a side opposite to the side where the laminated layer is formed;

(15) The laminated film according to any one of Items (1) to (14), wherein the thermoplastic resin film is a polyethylene terephthalate film or a polyethylene-2,6-naphthalate film;

(16) The laminated film according to any one of Items (1) to (15), wherein it is a polarizing plate-protective film;

(17) The laminated film according to Item (1), wherein it is a transfer film;

(18) The laminated film according to Item (17), wherein the three-dimensional average surface roughness (SRa) is from 3 to 10 nm;

(19) The laminated film according to Item (17), wherein it is for use in a transfer foil;

(20) The laminated film according to Item (19), wherein a side opposite to the side where the laminated layer is formed has a three-dimensional average surface roughness (SRa) of 3 to 15 nm; and

(21) The laminated film according to any one of Items (1) to (20), further including a layer that is made of at least one selected from a polyester resin, a urethane resin and an acrylic resin and formed on the side of the laminated film opposite to the side where the laminated layer is formed.

The laminated films show a high level of electrical conductivity regardless of humidity change and has good antifouling properties, good releasability, high water resistance, good smoothness, good oligomer precipitation-preventing properties at the time of heating, and high transparency. The amount of contaminants in the films is also small. Thus, it is ideally suited for inspection and very useful as a polarizing plate-protective laminated film or a transfer laminated film.

DETAILED DESCRIPTION

The term "thermoplastic resin film" is a generic name for films that can be melted or softened by heat, and it is not particularly limited. Typical examples of usable thermoplastic resin films include polyester films, polyolefin films such as polypropylene films and polyethylene films, polylactic acid films, polycarbonate films, acrylic films such as poly(methyl methacrylate) films and polystyrene films, polyamide films such as nylon films, polyvinyl chloride films, polyurethane films, fluororesin films, and polyphenylene sulfide films.

These may be homopolymers or copolymers. Among these materials, polyester films, polypropylene films, polyamide films, and the like are preferred in terms of mechanical properties, dimensional stability, transparency or the like, and polyester films are particularly preferred in terms of mechanical strength, general versatility or the like.

The laminated films are described below with reference to typical examples using a polyester film, which are not intended to limit the scope of the invention.

As regards the polyester film preferably used for the laminated film, the term "polyester" is a generic name for polymers in which an ester bond is a principal bond of the main chain. The laminated film may preferably use a material mainly composed of at least one component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate, and the like. One of these components may be used alone, or two or more of these components may be used in combination. Among them, a polyester comprising ethylene terephthalate as a main component, specifically, polyethylene terephthalate is particularly preferred, comprehensively taking into account such factors as quality and economy. In a case where heat, contraction stress or the like acts on the base material, polyethylene-2,6-naphthalate is more preferred, which has good heat resistance and stiffness. These polyesters may be copolymerized with any other dicarboxylic acid or diol component in part, preferably at 20% by mole or less.

The polyester material may also contain a variety of additives such as an antioxidant, a heat-resistant stabilizer, a weather-resistant stabilizer, an ultraviolet-absorbing agent, an organic smoothing agent, a pigment, a dye, organic or inorganic fine particles, a filler, an antistatic agent, and a nucleating agent, in such an amount that the properties thereof are not degraded.

The intrinsic viscosity of the above-described polyester (which may be measured in o-chlorophenol at 25° C.) is preferably in the range of 0.4 to 1.2 dl/g, more preferably in the range of 0.5 to 0.8 dl/g, and such a polyester is suitable for carrying out the invention.

A polyester film using the above polyester is preferably a biaxially oriented film, where the laminated layer is formed thereon. The biaxially oriented polyester film refers to a film that shows a biaxial orientation pattern in wide angle X-ray diffraction patterns and is generally produced by stretching an unstretched polyester sheet or film at a draw ratio of about 2.5 to 5 in the longitudinal direction and in the width direction, respectively, and then subjecting it to heat treatment so that crystalline orientation is completed.

While the thickness of the polyester film may be appropriately selected depending on the uses and type of the laminated film of the invention, in general, it is preferably, but not limited to, from 1 to 500 μm, more preferably from 5 to 250 μm, most preferably from 9 to 50 μm, in terms of mechanical strength, handleability or the like. The polyester base film may be a composite film produced by co-extrusion. In particular, a composite film of two or more layers can easily satisfy both smoothness and surface roughness requirements, for example, when smoothing fine particles are added to its skin layer, and its core layer is particle-free. A three-layer composite film also has merits such as satisfaction with both smoothness and surface roughness, for example, when smoothing fine particles are added to its skin layer, and its core layer is particle-free or uses a recycled material. Alternatively, the resulting films may be laminated by various methods before use.

The laminated layer refers to a layer-shaped component that is provided on the surface of the thermoplastic resin film serving as a substrate so as to form a laminate structure. The film itself may be a single layer or composed of a plurality of layers.

The laminated layer of the laminated film comprises a composition (A), an epoxy cross-linking agent (B) and an acrylic resin (C) having an alkyl chain of 18 to 25 carbon atoms. The composition (A) is a composition comprising at least a polythiophene and a polyanion and/or a composition comprising a polythiophene derivative and a polyanion. When the laminated layer contains the epoxy crosslinking agent (B) and/or its reaction product, the content of the composition (A), the acrylic resin (C) having an alkyl chain of 18 to 25 carbon atoms and the epoxy crosslinking agent (B) and/or its reaction product in the whole of the laminated layer is preferably at least 50% by weight, more preferably at least 70% by weight, most preferably at least 80% by weight.

In the laminated film, the composition (A) of the laminated layer preferably comprises a polythiophene and a polythiophene derivative.

The composition (A) for use in the laminated layer of the laminated film may be obtained by polymerizing a compound represented by Formula 1:

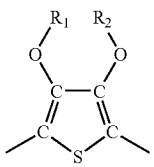

(Formula 1)

and/or a compound represented by Formula 2:

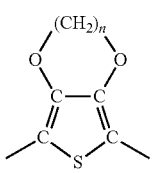

(Formula 2)

in the presence of a polyanion. In Formula 1, $R_1$ and $R_2$ each independently represent a hydrogen atom, an aliphatic hydrocarbon group of 1 to 12 carbon atoms, an alicyclic hydrocarbon group, or an aromatic hydrocarbon group, and may be each, for example, methyl, ethyl, propyl, isopropyl, butyl, cyclohexylene, benzene, or the like. In Formula 2, n is an integer of 1 to 4.

The laminated film preferably uses a polythiophene and/or a polythiophene derivative, which have a structural formula represented by Formula 2. For example, a compound represented by Formula 2 in which n is 1 (a methylene group), 2 (an ethylene group) or 3 (a propylene group) is preferred. Particularly preferred is a compound represented by Formula 2 in which n is 2 (an ethylene group), namely poly-3,4-ethylenedioxythiophene.

In the laminated film, examples of the polythiophene and/or polythiophene derivative may include a compound whose structure comprises a thiophene ring having substituents at positions 3 and 4 and a compound having oxygen atoms bonded to the carbon atoms at the positions 3 and 4, respectively, in the structure as mentioned above. Some compounds having a hydrogen or carbon atom directly bonded to the above-mentioned carbon atoms cannot easily form an aqueous coating liquid.

A description is given below of the polyanion of the composition (A) for use in the laminated layer of the laminated film.

In the laminated film, the polyanion is an acidic polymer in a free acid state and may be polycarboxylic acid, polysulfonic acid, polyvinylsulfonic acid, or the like. For example, the polycarboxylic acid may be polyacrylic acid, polymethacrylic acid, or polymaleic acid. For example, the polysulfonic acid may be polystyrene sulfonic acid. In particular, polystyrene sulfonic acid is most preferred in terms of electrical conductivity. The free acid may be partially in the form of a neutralized salt.

It is believed that if the polyanion is used in the polymerization, the polythiophene compound, which is originally insoluble in water, can be easily made water-dispersible or hydrophilic, and its function as an acid can also provide the function of serving as an agent for doping the polythiophene compound.

The polycarboxylic acid or the polysulfonic acid may be used in the form of a copolymer with any other copolymerizable monomer such as an acrylate ester, a methacrylate ester, and styrene.

The polycarboxylic acid or the polysulfonic acid for use as the polyanion preferably has a weight average molecular weight of 1,000 to 1,000,000, more preferably of 5,000 to 150,000, in terms of electrical conductivity and stability of coating liquids, while its molecular weight is not particularly limited. It may contain an alkali salt such as a lithium salt and a sodium salt or an ammonium salt in part, as long as the properties of the invention are not inhibited. It is believed that the neutralized salt can also act as a dopant, because it has been found that the equilibrium between an ammonium salt and polystyrene sulfonic acid functioning as a very strong acid shifts to the acidic side as the equilibrium reaction proceeds after the neutralization.

The polyanion is preferably present in an excessive solid weight ratio relative to the polythiophene or the polythiophene derivative, in terms of electrical conductivity. Based on 1 part by weight of the polythiophene and/or the polythiophene derivative, the polyanion is preferably more than 1 part by weight and not more than 5 parts by weight, more preferably more than 1 part by weight and not more than 3 parts by weight.

Of course, any other component may be used in the composition (A), as long as the effects are not reduced.

The composition (A) may be produced by the method described in JP-A No. 06-295016, JP-A No. 07-292081, JP-A No. 01-313521, JP-A No. 2000-6324, European Patent EP 602713, or U.S. Pat. No. 5,391,472, while other methods may be used. For example, an aqueous coating liquid comprising a complex composed of poly-3,4-ethylenedioxythiophene/polystyrene sulfonic acid, which is commercially available under the name "Baytron P" from Bayer/H. C. Starck (Germany), may be used.

For example, the composition (A) may be obtained by a process including the steps of using an alkali metal salt of 3,4-dihydroxythiophene-2,5-dicarboxylate as a starting material to form 3,4-ethylenedioxythiophene, introducing potassium peroxodisulfate, iron sulfate and the resulting 3,4-ethylenedioxythiophene into an aqueous solution of polystyrene sulfonic acid, and allowing them to react so that a composition comprising a complex of a polythiophene such as poly(3,4-ethylenedioxythiophene) with a polyanion such as polystyrene sulfonic acid can be obtained.

For example, the acrylic resin (C) having an alkyl chain of 18 to 25 carbon atoms for use in the laminated layer of the laminated film may be an acrylic resin of a copolymer of an acrylic monomer having a side chain with an alkyl group of 18 to 25 carbon atoms and another monomer copolymerizable with the acrylic monomer.

The copolymerization ratio of the acrylic monomer having a side chain with an alkyl group of 18 to 25 carbon atoms in the acrylic copolymer resin is preferably at least 35% by weight. The copolymerization ratio is more preferably from 35 to 85% by weight, most preferably from 60 to 80% by weight, in terms of antifouling properties, copolymerizability or the like.

The acrylic monomer having an alkyl chain of 18 to 25 carbon atoms (hereinafter also referred to as "long chain alkyl group") in its side chain is not particularly limited, as long as it satisfies the above requirements. In the invention, for example, long chain alkyl group-containing acrylic monomers may be used, such as octadecyl acrylate, nonadecyl acrylate, eicosyl acrylate, heneicosyl acrylate, docosyl acrylate, tricosyl acrylate, tetracosyl acrylate, pentacosyl acrylate, octadecyl methacrylate, nonadecyl methacrylate, eicosyl methacrylate, heneicosyl methacrylate, docosyl methacrylate, tricosyl methacrylate, tetracosyl methacrylate, and pentacosyl methacrylate. Monomers of more than 25 carbon atoms are difficult to obtain industrially, and the number of the carbon atoms has an upper limit of about 25.

The long chain alkyl group-containing acrylic resin for use in the invention preferably forms a water-based coating liquid in consideration of environmental issues. In order to form an emulsion, a vinyl monomer or an acrylic monomer as described below may be used as another copolymerizable monomer, for example. Examples of usable monomers include acrylic acid, methacrylic acid, methyl acrylate, ethyl acrylate, butyl acrylate, 2-ethoxyethyl acrylate, 2-methoxyethyl acrylate, 2-butoxyethyl acrylate, methyl methacrylate, ethyl methacrylate, acrylonitrile, methacrylonitrile, vinyl acetate, (meth)acrylic acid, styrene, itaconic acid, (meth)acrylamide, 2-hydroxyethyl(meth)acrylate, diethylene glycol mono(meth)acrylate, N-methylol(meth)acrylamide, dimethylaminoethyl(meth)acrylate, diethylaminoethyl (meth) acrylate, (meth)acryloyloxyethyl phosphate, sodium vinylsulfonate, sodium styrenesulfonate, and maleic anhydride.

Examples of preferred long chain alkyl group-containing acrylic resins include copolymers of at least one selected from stearyl methacrylate, behenyl methacrylate, behenyl acrylate, 2-hydroxyethyl methacrylate, methacrylic acid, acrylic acid, and methyl meth-acrylate.

While the epoxy crosslinking agent (B) for use in the laminated layer of the laminated film is not particularly limited, its molecular weight is preferably at most 1,000. Particularly, if the epoxy crosslinking agent (B) is water-soluble and has a molecular weight of 1,000 or less, flexibility or fluidity can be developed in the stretching process, the stretch following capability of the mixture for forming the laminated layer can be high after drying, a coating crack-induced whitening phenomenon can be prevented, and transparency can be imparted. On the other hand, if the molecular weight is too high, for example, a certain phenomenon such as cracking of the coating film can occur during stretching after coating and drying, and the transparency can tend to decrease. If the molecular weight is at most 800, more preferably at most 600, the epoxy crosslinking agent (B) can be more compatible with the composition (A) and the long chain alkyl group-containing acrylic resin (C) so that transparency can be improved.

The epoxy crosslinking agent (B) is preferably a water-soluble crosslinking agent, because it can improve transparency, electrical conductivity and the like.

The water-soluble crosslinking agent refers to a crosslinking agent with a water solubility of at least 80%, and the "water solubility" refers to the ratio of the dissolved part to 10 parts of the solid of the crosslinking agent which is mixed with 90 parts of water at 23° C. Therefore, a water solubility of 80% indicates a state where 80% (by weight) of 10 parts of the crosslinking agent is dissolved in 90 parts of water at 23° C., while the remaining 20% (by weight) of the crosslinking agent is left undissolved. A water solubility of 100% indicates a state where 10 parts of the crosslinking agent used is completely dissolved in 90 parts of water. The epoxy crosslinking agent (B) preferably has a water solubility of at least 90%, more preferably of 100%. If the water solubility is high, not only the coating liquid itself can be made hydrophilic, but also good transparency and electrical conductivity can be provided.

The water-soluble epoxy crosslinking agent is preferred, because it can be prevented from blocking, prevented from contaminating the interior of a tenter with which heat treatment is performed, and prevented from polluting the atmosphere, for example, in contrast to an additive of a high-boiling solvent such as glycerin.

In the laminated film, the epoxy crosslinking agent (B) as described below is preferably used. For example, the epoxy crosslinking agent (B) may be of sorbitol polyglycidyl ether type, polyglycerol polyglycidyl ether type, diglycerol polyglycidyl ether type, polyethylene glycol diglycidyl ether type, or the like. Specifically, epoxy compounds "DENACOL" (EX-61, EX-614, EX-614B, EX-512, EX-521, EX-421, EX-313, EX-810, Ex-830, EX-850, and the like) manufactured by Nagase ChemteX Corporation, diepoxy-polyepoxy compounds (SR-EG, SR-8EG, SR-GLG, and the like) manufactured by Sakamoto Yakuhin Kogyo, Co., Ltd., or an epoxy crosslinking agent "EPICLON" EM-85-75W or CR-5L manufactured by Dainippon Ink and Chemicals, Incorporated may be preferably used. In particular, water-soluble products are preferred.

The epoxy crosslinking agent (B) preferably has a weight per epoxy equivalent of 100 to 300 WPE, in terms of reactivity. The weight per epoxy equivalent is more preferably from 110 to 200 WPE.

The coating liquid for use in producing the laminated film is preferably an aqueous coating liquid containing water as a substantially main medium. For the purpose of improvement of coatability, transparency and the like, the coating liquid for use in producing the laminated film may contain a proper amount of an organic solvent at such a level that the effects of the invention are not inhibited. For example, isopropyl alcohol, tert-butyl cellosolve, n-butyl cellosolve, ethyl cellosolve, acetone, N-methyl-2-pyrrolidone, ethanol, methanol, or the like is preferably used. In particular, isopropyl alcohol is preferably used in terms of improving coatability, and the content thereof in the coating liquid is preferably at most 20% by weight, more preferably at most 10% by weight. A large amount of an organic solvent in the coating liquid is not preferred, because if such a coating liquid is used for an in-line coating process, it can have a risk of explosion in a tenter for carrying out pre-heating, drying, stretching, heat treatment, and the like.

In the laminated film, the epoxy crosslinking agent (B), which forms the laminated layer, may be bonded to a functional group contained in a component of the laminated layer, may be in the unreacted state, or may partially form a crosslinked structure. The epoxy crosslinking agent (B) that forms the laminated layer is preferably crosslinked in terms of the strength, blocking resistance, sticky feeling, and water resistance of the coating film. The crosslink may be a bond to a functional group contained in any other component or may be a self-crosslinked structure of the agent itself.

Different crosslinking agents may also be used in combination preferably, and, for example, a combination of the epoxy crosslinking agent (B) and a melamine cross-linking agent or a combination of different types of epoxy crosslinking agents (which form the cross-linking agent (B)) is preferably used, because the properties of both agents can be developed. Examples of the crosslinking agent usable in this case include melamine crosslinking agents, epoxy crosslinking agents, aziridine crosslinking agents, amide-epoxy compounds, titanate coupling agents such as titanium chelates, oxazoline crosslinking agents, isocyanate cross-linking agents, methylolated or alkylolated urea types, and acrylamide types.

In the laminated layer of the laminated film, the weight ratio of the solids of the epoxy crosslinking agent (B) and/or its reaction product to the solids of the composition (A) and the epoxy crosslinking agent (B) and/or its reaction product is preferably from 50 to 95% by weight. For example, if the solid weight ratio of the epoxy crosslinking agent (B) and/or its reaction product is less than 50% by weight, electrical conductivity cannot easily be developed. If the ratio of the epoxy crosslinking agent (B) and/or its reaction product is extremely low (for example, less than 10% by weight), the coating film can be at an insulator level like an unprocessed polyester film and can be significantly whitened and have poor transparency. On the other hand, if the ratio of the epoxy crosslinking agent (B) and/or its reaction product is more than 95% by weight, the amount of the composition (A) contributable to electrical conductivity can be too small, so that electrical conductivity cannot easily be developed, although the transparency can be good. According to our investigation, the solid weight ratio of the epoxy crosslinking agent (B) and/or its reaction product is preferably from 50 to 80% by weight, more preferably from 60 to 80% by weight, in terms of transparency and electrical conductivity. If the content of the epoxy crosslinking agent (B) in the laminated layer is from 50 to 90% by weight, both transparency and electrical conductivity can be simultaneously at very high level.

In the laminated film, the laminated layer necessarily comprises the acrylic resin (C) having an alkyl chain of 18 to 25 carbon atoms as well as the composition (A) and the epoxy crosslinking agent (B) and/or its reaction product. Based on 100 parts by weight of the sum of the composition (A) and the epoxy crosslinking agent (B) and/or its reaction product, the acrylic resin (C) contained in an amount of 15 to 100 parts by weight can produce anti-fouling properties, and the acrylic resin (C) contained in an amount of 15 to 40 parts by weight can impart extremely high antifouling properties and also electrical conductivity to a polarizing plate-protective laminated film, or can impart extremely high releasability and also electrical conductivity to a transfer laminated film. More preferably, 15 to 30 parts by weight of the acrylic resin (C) can achieve extremely high level of electrical conductivity and oligomer precipitation-preventing properties at the time of heating. It is expected that this should be because of a phase separation phenomenon between a hydrophilic compound material such as the polythiophene-based composition (A) and the epoxy crosslinking agent (B) (namely a substance with high surface energy) and a hydrophobic compound material such as the acrylic resin (C) having an alkyl chain of 18 to 25 carbon atoms (namely a substance with low surface energy). It is expected that this phenomenon should be more significantly produced when a process capable of performing heat treatment at high temperature, such as in-line coating, is used.

While the laminated layer of the laminated film includes, as essential components, the composition (A), the epoxy crosslinking agent (B) and/or its reaction product, and the acrylic resin (C) having an alkyl chain of 18 to 25 carbon atoms, it may further include at least one type of any other resin, particularly at least one type of polyester resin, urethane resin, acrylic resin, or the like. However, if the content of any other resin (such as a polyester resin) in the laminated layer is more than 20% by weight, for example, in a polarizing plate-protective laminated film, the effects, particularly antifouling properties can tend to be inhibited. Thus, if any other resin is added, its content should preferably at most 10% by weight, more preferably at most 5% by weight. In a transfer laminated film, the content of any other resin should preferably at most 70% by weight, more preferably at most 50% by weight in terms of releasability.

Another layer comprising at least one selected from a polyester resin, a urethane resin, and an acrylic resin may be formed on the side opposite to the laminated layer, which is formed on at least one side of the thermoplastic resin film. In this case, the laminated layer side can have humidity-independent, high level of electrical conductivity, antifouling properties, smoothness, water resistance, and oligomer precipitation-preventing properties, while the other side can form a layer with a different function such as adhesive properties. For example, a pressure-sensitive adhesive layer or a print layer may be formed on the layer, which is useful for improvement in adhesive properties or the like.

The laminated layer may further contain a variety of additives such as an antioxidant, a heat-resistant stabilizer, a weather-resistant stabilizer, an ultraviolet-absorbing agent, an organic smoothing agent, a pigment, a dye, organic or inorganic fine particles, a filler, an antistatic agent, and a nucleating agent, as long as the effects of the invention are not reduced.

In particular, the addition of inorganic particles to the coating liquid and biaxial stretching are further preferred, because the smoothness can be improved.

The inorganic particles to be added may be typically made of silica, colloidal silica, alumina, alumina sol, kaolin, talc, mica, calcium carbonate, or the like. Any type of inorganic particles may be used as long as the effects of the invention are not reduced.

Next, a description is given of surface roughness.

Concerning the surface roughness of the laminated film, at least one side of the laminated film should have a three-dimensional average surface roughness (SRa) of 3 to 50 nm. Because of this feature, the film obtained is particularly preferably used for polarizing plate protection, which is one application placing importance on surface smoothness.

The three-dimensional average surface roughness of 10 points (SRz) characterizes relatively large projections or depressions (irregularities). If this value is large, the projections can be recognized as foreign matters, for example, at the time of inspection for defects in polarizing plates. For protection of polarizing plates, SRa is more preferably from 10 to 35 nm, most preferably from 10 to 30 nm, and SRz is preferably at most 1,500 nm, more preferably at most 1,000 nm, still more preferably at most 800 nm. SRa and SRz may be measured with a light needle type three-dimensional roughness meter ET-30HK (manufactured by Kosaka Laboratory Ltd.). According to JIS-B-0601, the measurement may be performed as described in the corresponding measurement method section.

For example, an optical film, its protective film or the like may be used as a component of a laminate and peeled from a transfer film. In such a case, the smoothness or glossiness of the surface of the component after the peeling is very important. Concerning the surface roughness of the laminated film, therefore, at least one side thereof preferably has a three-dimensional average surface roughness (SRa) of 3 to 15 nm. In the invention, the surface roughness of the film face for receiving the subject to be transferred is very important and should be more preferably from 3 to 10 nm, most preferably from 3 to 6 nm. The three-dimensional average surface roughness of 10 points (SRz) characterizes relatively large projections or depressions (irregularities). If this value is too large, the surface of the subject to be transferred can be significantly roughened in part so that features such as loss of glossiness can be presented. SRz is preferably at most 500 nm, more preferably at most 300 nm. For example, setting the surface roughness (SRa and SRz) as described above allows the component surface to have very good smoothness or glossiness after the peeling or allows the transfer foil to have very good glossiness and the like. It would be understood that the laminated layer side of the laminated film may be used to receive the subject to be transferred, or the side opposite to the laminated layer side may be used to receive the subject to be trans In order to achieve the surface roughness described above, particles that may be added to the laminated layer preferably have an average particle size of 0.01 to 0.3 μm, more preferably of 0.02 to 0.15 μm, most preferably of 0.05 to 0.1 μm, and the amount thereof is preferably, but not limited to, 0.05 to 20 parts by weight, more preferably 0.1 to 10 parts by weight, in terms of solid weight ratio.

The haze of the laminated film is preferably at most 5%, more preferably at most 4%, most preferably from 0.9 to 3.5%. If the haze is higher than 5%, scattering of transmitted light can be increased to reduce transparency so that degraded inspection efficiency such as defects can tend to be provided. On the other hand, extremely high transparency can tend to be counterproductive, because defects such as contaminants in the film can be observed even at a negligible level for a polarizing plate protection use.

The number of internal contaminant particles with an average particle size of at least 100 μm contained in the laminated film should be less than $10/m^2$, preferably less than $5/m^2$, more preferably less than $2/m^2$. If it is $10/m^2$ or more, for example, a liquid crystal product can be erroneously determined as a defective at the time of product inspection, due to the count of the internal contaminant particles in the polarizing plate-protective film, although its components themselves are not defective.

In order to keep the internal contaminant within the above range, a high-precision filter may be placed between an extruding unit and a slit, a raw material with fewer impurities may be used, or proper extrusion temperatures may be employed. Thereby, the above range can be achieved. For example, a filter with an average aperture of 3 to 15 μm, preferably of 5 to 10 μm, produced by compressing and sintering stainless steel fibers (FSS) is preferably used as a polyester resin filter in a film-forming process. Another filter with an average aperture of 10 to 30 μm produced by sintering stainless steel powder (PSS) may be used behind the stainless fiber-compressed and sintered filter, and the filters may be used in this order for continuous filtration. Alternatively, a composite filter having the two types of filters in a single capsule (FP) may be used. This technique can remove catalyst aggregates and coarse particles and also efficiently remove resin gels and thermally degraded products, and can increase the life of the filters. This technique is particularly preferred, because it can improve productivity. Additionally, a certain metal catalyst that is resistant to forming the aggregates as mentioned above, such as a titanium compound and a germanium compound, can be more effectively used as a polymerization catalyst.

With respect to variations in cross-sectional thickness measured in the transverse direction (TD) of the laminated film, the number of portions with a thickness variation of at least 0.3 μm is preferably at most 5, more preferably at most 3, still more preferably at most 1, per 1 m, when the thickness variation is measured per 3 cm along the TD. When the laminated film is used as a polarizing plate-protective film, for example, the portions with the thickness variation produced can be counted as stripe-like defects at the time of inspection so that the polarizing plate with no problem can be determined as an unacceptable product. Such defects tend to be formed when the slit has a flaw or when a degraded polymer is deposited on the lip portion of the slit. For example, a raw material with fewer impurities may be used, the slit may be cleaned, or the lip gap of the slit may be widened to prevent a deposition of a degraded polymer, so that the variations can be kept within the above range.

As used herein, the term "thickness variation" refers to the difference between the maximum thickness and the minimum thickness among the measurements obtained by continuous measurement of film thickness in a certain range.

The number of deposited contaminant particles of at least 100 μm on the laminated film is preferably less than 10, more preferably less than 5, still more preferably less than 2, per $m^2$. If it is $10/m^2$ or more, for example, in a case where the laminated film is used as a polarizing plate-protective film, a liquid crystal product can be erroneously determined as a defective at the time of product inspection, due to the count of the deposited contaminant particles on the polarizing plate-protective film, although its components themselves are not defective. To keep the deposited contaminant particles within the above range, the cleanliness of the film-forming chamber may be increased, the content of oligomers in a stenter may be reduced, deposited contaminants may be removed using an adhesive roll in a film-forming line, or deposited contaminants may be removed with air from a dust remover or the like placed in the film-forming line. Thereby, the above range can be achieved.

The water-based resin material may be applied using a coating method such as reverse coating, spray coating, bar coating, gravure coating, rod coating, and die coating.

In general, the thickness of the laminated layer is preferably, but not limited to, in the range of 0.005 to 0.2 μm, more preferably in the range of 0.01 to 0.1 μm, most preferably in the range of 0.01 to 0.05 μm. If the laminated layer is too thin, the electrical conductivity can be poor.

In a process of producing the laminated polyester film, the laminated layer is preferably formed by a method that includes forming a coating during a polyester film production process and stretching the coating together with the base film. For example, a melted and extruded polyester film before crystalline orientation may be stretched at a draw ratio of about 2.5 to 5 in the longitudinal direction, and a coating liquid may be continuously applied to the uniaxially-oriented film. The coated film may be allowed to pass through a stepwise heating zone to be dried and stretched at a draw ratio of about 2.5 to 5 in the width direction. The coated film may be further continuously introduced into a heating zone at 150 to 250° C. such that crystalline orientation can be completed. The laminated polyester film can be obtained by such a process (in-line coating process). In this case, the coating liquid to be used is preferably water-based, in terms of environmental pollution or explosion proof.

Before application of the coating liquid, the surface of the base film (the uniaxially-oriented film in the above case) is preferably subjected to corona discharge treatment or the like so as to have a wet tensile strength of preferably at least 47 mN/m, more preferably of at least 50 mN/m, in terms of improving the adhesion between the base film and the laminated layer. It is also preferred that a slight amount of an organic solvent such as isopropyl alcohol, butyl cellosolve and N-methyl-2-pyrrolidone should be added to the coating liquid such that wettability or adhesion to the base film can be improved.

Next, methods for producing the laminated film are described in more detail with reference to non-limiting examples where polyethylene terephthalate (hereinafter abbreviated as "PET") is used for the base film.

The description below is of more specific methods for producing the laminated film. PET pellets with a intrinsic viscosity of 0.5 to 0.8 dl/g are dried under vacuum and then fed into an extruder and melted at 260 to 300° C. Thereafter, the melt is filtered through a 3-μm cut-off stainless steel fiber sintered filter (FSS) and then extruded in the form of a sheet from a T-shaped die slit. The sheet is wound around a specular casting drum with a surface temperature of 10 to 60° C. by an electrostatic casting process and cooled and solidified to form an unstretched PET film. The unstretched film is stretched at a draw ratio of 2.5 to 5 in the longitudinal direction (the direction of travel of the film) between rolls heated to 70 to 120° C. At least one side of the film is subjected to corona discharge treatment so that the surface has a wet tensile strength of at least 47 mN/m, and the aqueous coating liquid according to the invention is applied to the treated surface. The coated film is held with a clip and introduced into a hot-air zone heated to 70 to 150° C. to be dried, and then stretched at a draw ratio of 2.5 to 5 in the width direction and subsequently introduced into a heat treatment zone at 160 to 250° C. and heat-treated for 1 to 30 seconds so that crystalline orientation is completed. In this heat treatment process, if necessary, the film may be relaxed by 1 to 10% in the width or longitudinal direction. The biaxial stretching may be any of simultaneous biaxial stretching or sequentially performed longitudinal stretching and transverse stretching, and after the longitudinal and transverse stretching, stretching may be performed again in any of the longitudinal and transverse directions. The thickness of the polyester film is preferably, but not limited to, from 1 to 500 μm. Simultaneous biaxial stretching is a method for simultaneously performing longitudinal stretching and transverse stretching, in which the stretching temperature is preferably from 70 to 180° C., and the draw ratio is preferably in the range of 9 to 35.

At least one material selected from the laminated layer-forming composition and the reaction product of the laminated layer-forming composition may be added to the base film to be covered with the laminated layer, so that the adhesion between the laminated layer and the base film or smoothness can be improved. The amount of addition of the laminated layer-forming composition or the reaction product thereof is preferably not less than 5 ppm and less than 20% by weight in total, in terms of adhesion or smoothness. Considering environmental protection and productivity, methods using recycled pellets containing the laminated layer-forming composition are particularly preferred.

The polarizing plate-protective laminated film obtained as described above exhibits high level of electrical conductivity, regardless of humidity change, has good anti-fouling properties, smoothness and transparency, and also has oligomer precipitation-preventing properties, surprisingly, so that it is particularly suitable for use as a base film for polarizing plate protection.

The transfer laminated film obtained as described above has high level of electrical conductivity and good releasability, water resistance and glossiness and also has oligomer precipitation-preventing properties at the time of heating. Thus, it is suitable for use as a base film of a transfer foil for a hot stamping foil process, an in-mold transfer process, a vacuum press transfer process, or the like. Also in IT, flat panel display, cellular phone, and optics applications, for example, a hard coat layer and an adhesive layer may be formed on the laminated film, and the laminate may be used for transfer in the process of assembling components into products. A film- or sheet-shaped product for forming an optical component may be directly formed on the surface of the overlay of the laminated film by a coating method or the like, and then the film- or sheet-shaped product may be peeled as needed, with the aid of the releasability of the laminated layer and also with the aid of its smoothness, so that an optical component with high glossiness can be obtained by a peeling method, a solution casting method or the like.

Methods for determining properties and for evaluating effects include the following.

(1) Thickness of Laminated Layer

According to an ultrathin section staining method, for example, an ultrathin section sample was cut from the cross-section of the laminated polyester film, stained with $RuO_4$ or $OsO_4$ or double-stained with both of them, and observed and photographed with a transmission electron microscope (TEM). The photograph of the cross-section was used to measure the thickness of the laminated layer. The average of measurements at 10 portions in the measured view was used.

Observation Method

Equipment: transmission electron microscope (Model H-7100FA manufactured by Hitachi, Ltd.)
Measurement Conditions: acceleration voltage 100 kV
Sample Preparation: ultrathin section method
Observation Magnification: 200,000×

(2) Surface Roughness

The surface of the laminated layer of the laminated film was measured for surface roughness. According to JIS-B-0601, the three-dimensional average surface roughness (SRa) and the three-dimensional average surface roughness of 10 points (SRz) were measured using a light-needle type three-dimensional roughness meter ET-30HK (manufactured by Kosaka Laboratory Ltd.) under the conditions: measurement length: 0.5 mm, the number of measurements: 80, cut-off: 0.25 mm, feed pitch: 5 μm, needle load: 10 mg, and speed: 100 μm/second. The measurement was repeated three times, and the average of the measurements was used.

(3) Electrical Conductivity

The surface of the laminated layer of the laminated film was measured for electrical conductivity, which was evaluated using the value of specific surface resistance. After the laminated film was allowed to stand under ordinary conditions (23° C. and a relative humidity of 65%) for 24 hours, the specific surface resistance was measured in the same atmosphere using Loresta EP (Model No. MCP-T360, manufactured by Mitsubishi Chemical Corporation) according to JIS-K-7194, in the unit of $\Omega/\square$. Specific resistances not higher than $1\times10^6$ $\Omega/\square$ are measurable with this measuring device.

On the other hand, the specific surface resistance in the range of $1\times10^6$ $\Omega/\square$ or more was measured using a digital ultrahigh resistance/fine current ammeter R8340A (manufactured by ADVANTEST CORPORATION) after a voltage of 100 V was applied for 10 seconds. The unit is $\Omega/\square$. According to the invention, products with a specific surface resistance of $1\times10^6$ $\Omega/\square$ or less were evaluated as having good electrical conductivity, and those with the specific surface resistance of $1\times10^5$ $\Omega/\square$ or less were evaluated as having very good (excellent) electrical conductivity.

In order to measure dependency of the electrical conductivity on humidity, the measurement was performed in the same manner as described above, after the products were allowed to stand in an environment at 23° C. and a relative humidity of 20% for 1 hour. Each measurement was repeated twice, and the average of the two measured values was used.

(4) Water Resistance

The laminated film washed with running tap water for 1 minute and then air-dried at 60° C. for 5 minutes and evaluated for electrical conductivity according to the description of Section (3). If the electrical conductivity change before and after the water resistance test is small, the sample has good water resistance.

(5) Antifouling Properties (Contact Angle with Water Proplet)

The surface of the laminated layer of the laminated film was evaluated for anti-fouling properties. Low surface energy leads to good antifouling properties, and hydrophobic surfaces have good antifouling properties. With respect to the invention, contact angle with a water droplet was used as a parameter for antifouling properties, and the larger contact angle with a water droplet was determined as indicating the better antifouling properties. With respect to the invention, a contact angle of at least 95 degrees was determined as indicating good antifouling properties, that of at least 98 degrees as very good antifouling properties, and that of at least 100 degrees as extremely good antifouling properties. The measurement was performed under the conditions of 23° C. and a relative humidity of 65% with a contact angle meter Model CA-D (manufactured by Kyowa Interface Science Co., Ltd.), and the average of three measurements was used.

(6) Releasability (Contact Angle with Water Proplet)

The surface of the laminated layer of the laminated film was evaluated for releasability. Low surface energy leads to good releasability, and hydrophobic surfaces have good releasability. With respect to the invention, contact angle with a water droplet was used as a parameter for releasability, with the larger contact angle with a water droplet indicating the better releasability. With respect to the invention, a contact angle of at least 95 degrees was determined as indicating good releasability, that of at least 98 degrees as very good releasability, and that of at least 100 degrees as extremely good releasability. The measurement was performed under the conditions of 23° C. and a relative humidity of 65% with a contact angle meter Model CA-D (manufactured by Kyowa Interface Science Co., Ltd.), and the average of three measurements was used.

(7) Haze

Haze was used as an index of transparency. After the laminated film was allowed to stand under ordinary conditions (23° C. and a relative humidity of 65%) for 2 hours, the haze was measured using a fully-automatic, direct-reading haze computer HGM-2DP manufactured by Suga Test Instruments Co., Ltd. The average of three measurements was used as a haze value of the sample.

(8) Oligomer Precipitation-Preventing Properties (Part 1)

The surface of the laminated layer of the laminated film was evaluated for oligomer precipitation-preventing properties. The obtained laminated film was allowed to stand in a hot-air oven at 180° C. for 30 minutes so that oligomers were precipitated from the base film. The opposite surface (if any laminated layer or coating layer is formed on the opposite surface, the surface thereof) was wiped with DMF (N,N-dimethylformamide)-impregnated Bencotton (manufactured by Asahi Kasei Corporation), and the haze was measured according to the above haze measurement method. The smaller increase in the haze was judged as indicating the better oligomer precipitation-preventing properties.

(9) Oligomer Precipitation-Preventing Properties (Part 2)

The surface of the laminated layer of the laminated film was evaluated for oligomer precipitation-preventing properties. The obtained laminated film was allowed to stand in a hot-air oven at 180° C. for 30 minutes so that oligomers were precipitated from the base film. The surface of the laminated layer with a size of 10 cm×10 cm was immersed in DMF (N,N-dimethylformamide) for 3 minutes, and then the amount of the released oligomer in the DMF was determined by HPLC (high performance liquid chromatography) analysis and quantified. The measured amount was converted into a precipitated amount (mg) per 1 $m^2$ of the immersed film surface, which was used as a unit. The smaller precipitated amount per unit area was evaluated as indicating the higher oligomer precipitation-preventing properties, and for example, about 2 $mg/m^2$ was judged as sufficient oligomer precipitation-preventing prop

(10) Glossiness

A model test for the glossiness of a subject to be transferred with respect to the case where the laminated film is for use in transfer applications was performed, in which 0.5 μm aluminum was vapor-deposited on the laminated layer of the laminated film, and the glossiness of the resulting surface was evaluated as shown below.

Excellent: The surface uniformly has extremely good glossiness.
Good: The surface has good glossiness.
Poor: The surface has no glossiness and is mat.

(11) Internal Contaminant Inspection

Internal contaminant inspection was performed by a crossed-Nicol method. Specifically, the sample was inserted between two pieces of polarizing plates when the inspection is performed. The measuring instrument used was a strain meter Model HEIDON-13 manufactured by Shinto Scientific Co., Ltd. Surface dust and the like were removed using an air duster, and then samples corresponding to an area of 10 $m^2$ were examined. When any contaminant was observed, its size was measured with an optical microscope (50× to 400×). Concerning the size, the length (major axis) of the longest part of the contaminant was measured, and contaminants whose longest part was at least 100 μm were counted. The total count was assigned as A and converted into the value according to the formula below for comparison.

The number of internal contaminant particles $(/m^2)$= $A/10$ $(m^2)$.

(12) Thickness Variation

A contact type continuous thickness meter KG601B manufactured by Anritsu Corp. was used. Evaluation of the sample was performed in the transverse direction (TD), and the measurement was performed over the overall width of the product. The frequency of the measurement over the overall width was once per 10 m in the machine direction (MD), and the measurement was repeated 5 times. From the measurement results, portions each having a thickness variation of at least 0.3 μm per 3 cm length of the film were counted. The total count was assigned as B and converted into the value according to the formula below for comparison.

Thickness variation $(/m)=B$ (the total count from the measurement repeated 5 times)/5 (times)/width length (m) of the single measurement.

(13) Deposited Contaminant Inspection

A visual inspection was performed in a dark room using reflected light of a three-wavelength fluorescent lamp. The inspection was performed on samples corresponding to 10 m², and when any contaminant was observed, its size was measured using an optical microscope (50× to 400×). Concerning the size, the length (major axis) of the longest part of the contaminant was measured, and contaminants with a major axis length of at least 100 μm were counted. The total count was assigned as C and converted into the value according to the formula below for comparison.

The number of deposited contaminant particles (/m²)= C/10 (m²).

(14) Polarizing Plate Inspection Efficiency

The resulting polyester film was coated with a release agent in an amount of 0.2 g/mm² and dried at 175° C. for 15 seconds to form a release film. The release agent was composed of 100 parts of a curable silicone resin (KS-779H manufactured by Shin-Etsu Chemical Co., Ltd.), 1 part of a curing agent (CAT-PL-8 manufactured by Shin-Etsu Chemical Co., Ltd.) and 2200 parts of a methyl ethyl ketone/toluene mixture solvent. Two pieces of polarizing plates with neither contaminant nor bright point defect were previously prepared and named as Polarizing Plates A and B. The release film was bonded to Polarizing Plate A through a pressure-sensitive adhesive in such a manner that the width direction of the release film was parallel to the orientation axis of the polarizing film. Polarizing Plate B was superposed on the lower side of Polarizing Plate A in such a manner that its orientation axis was orthogonal to the film width direction, and white light was applied from below Polarizing Plate B. Visual observation was performed by three testers from above Polarizing Plate A, and marking was performed when defects were observed. Thereafter, their sizes were measured with an optical microscope, and the results were averaged. The visual testability was evaluated according to the criteria below. The measurement area observed by one person was 10 m². The optical microscope was used at a magnification of 50× to 400× in the measurement of the size of the defects.

Excellent: There are 0 or less than 3/m² of defects with a major axis length of at least 100 μm.
Good: There are not less than 3/m² and less than 10/m² of defects with a major axis length of at least 100 μm.
Poor: There are at least 10/m² of defects with a major axis length of at least 100 μm.

(15) Method for Evaluating Separation Electrification

A polyester pressure-sensitive adhesive tape (Nitto 31B) was attached to the surface of the release layer of the release film prepared in the above section (14), bonded by pressing with a 5 kg press roller, and held at 70° C. for 24 hours. Thereafter, while the tape was fixed in a horizontal position with the release film side facing downward, the release film was peeled at 180 degrees at a pull speed of 500 mm/minute. Thereafter, the electric potential of the pressure-sensitive adhesive surface of the polyester pressure-sensitive adhesive tape was measured from a position 25 mm distant from the pressure-sensitive adhesive surface with a meter FMX-002 manufactured by Simco Japan Inc. and defined as the amount of separation electrification. The measurement was repeated 10 times.

Good: The amount of separation electrification is within the range of −2 kV to 2 kV, and there is no unusual sound in peeling.
Poor: The amount of separation electrification is lower than −2 kV or higher than 2 kV.

(16) Evaluation of Stripe-Like Defect

A release film was prepared in the same manner as in the above section (14), and visual observation was performed by the same method as in the above section (14).

Good: No stripe-like defect is observed.
Poor: A stripe-like defect(s) is observed.

EXAMPLES

The films and methods are described with reference to the examples below, which are not intended to limit the scope of the films and methods.

Example 1

A hundred kg of high-purity terephthalic acid and 45 kg of ethylene glycol slurry were gradually fed over 4 hours to an esterification reactor which had been previously fed with about 123 kg of bis(hydroxyethyl)terephthalate and kept at a temperature of 250° C. under a pressure of $1.2 \times 10^5$ Pa. After the feeding was completed, the esterification was further performed for 1 hour, and the esterification product was transferred to a polycondensation tank. Subsequently, 0.01 parts by weight of ethyl(diethylphosphono)acetate was added to the esterification product-containing polycondensation tank, and 0.04 parts by weight of magnesium acetate tetrahydrate and a polymerization catalyst of antimony trioxide (manufactured by SUMITOMO METAL MINING CO., LTD.) in such an amount that the resulting polyester would contain 400 ppm of the antimony atom were further added thereto. An additive of silica particles with an average particle size of 0.4 μm was added in such an amount that the polyester would contain 0.015% by weight thereof, and another additive of silica particles with an average particle size of 1.5 μm was added in such an amount that the polyester would contain 0.006% by weight thereof. Thereafter, while the oligomer was stirred at 30 rpm, the reaction system was heated from 250° C. to 285° C. over 60 minutes, and the pressure was reduced to 40 Pa. The time period to reach the final pressure was 60 minutes. At the time when a certain stirring torque was reached, the reaction system was subjected to nitrogen purging and returned to atmospheric pressure so that the polycondensation reaction was stopped. The product was then discharged in the form of a strand into cold water at 20° C. and immediately cut into pieces so that polyester pellets were obtained. The time from the start of the pressure reduction to the achievement of the certain stirring torque was 3 hours.

The resulting polyester pellets had a intrinsic viscosity of 0.63 dl/g, a carboxyl end group content of 40 equivalents/ton, a glass transition temperature (Tg) of 78° C., and a cyclic trimer content of 1.1% by weight.

The polyester pellets were dried under vacuum to have a moisture content of 20 ppm and then fed into an extruder and melted at a temperature of 285° C. The melt was then filtered through an 8 μm cut-off stainless steel fiber sintered filter (FSS) and then extruded in the form of a sheet from a T-shaped die slit with a lip gap of 3.5 mm. The extruded polymer was wound around a specular casting drum with a surface temperature of 20° C. using an electrostatic casting process and cooled to be solidified. The resulting unstretched film was heated to a temperature of 88° C. and stretched at a draw ratio of 3.3 in the longitudinal direction to form a uniaxially-oriented film. The uniaxially-oriented film was subjected to corona discharge treatment in the air, and the laminated layer-forming coating liquid described below was applied to the treated surface. The uniaxially-oriented film coated with the laminated layer-forming coating liquid was introduced into a preheating zone, while being held with a clip, and dried at a temperature of 95° C., and then continuously stretched at a draw ratio of 3.8 in the width direction in a heating zone at a temperature of 110° C. The film was further heat-treated in a heating zone at a temperature of 230° C. to give a laminated PET film in which crystalline orientation was completed. The resulting PET film had a thickness of 38 μm, in which the laminated layer had a thickness of 0.025 μm. The results are shown in Table 1. It had good electrical conductivity, antifouling properties, transparency, inspection efficiency, oligomer precipitation-preventing properties, and the like.

Laminated Layer-Forming Coating Liquid

Coating Liquid A1: an aqueous coating liquid of a complex of poly-3,4-ethylenedioxythiophene/polystyrene sulfonic acid (Baytron P manufactured by Bayer/H. C. Starck (Germany)).

Coating Liquid B1: an aqueous coating liquid in which a polyhydroxyalkane polyglycidyl ether type epoxy crosslinking agent (CR-5L manufactured by Dainippon Ink and Chemicals, Incorporated, with a weight per epoxy equivalent of 180 and a water solubility of 100%) was dissolved in water.

Coating Liquid C1: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with a long chain alkyl group of 22 carbon atoms) | 65% by weight |
| methacrylic acid | 25% by weight |
| 2-hydroxyethyl methacrylate | 10% by weight |

Coating Liquids A1 and B1 were mixed in a solid weight ratio of 10/90 (Coating Liquid A1/Coating Liquid B1), and the mixture was aged at room temperature for 5 days (the product is shortly named Aged Coating Liquid 1). Aged Coating Liquid 1 and Coating Liquid C1 were then mixed in a solid weight ratio of 100/20 (Aged Coating Liquid 1/Coating Liquid C1) to form an laminated layer-forming coating liquid. In this process, the solid weight ratio between the respective coating liquids was as follows: Coating Liquid A1/Coating Liquid B1/Coating Liquid C1=10/90/20.

Example 2

A laminated PET film was obtained using the process of Example 1, except that the laminated layer-forming coating liquid shown below was used in place of that of Example 1.

Laminated Layer-Forming Coating Liquid

Coating Liquids A1, B1 and C1 used were the same as those in Example 1.

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C1 were then mixed in a solid weight ratio of 100/20 (Aged Coating Liquid 2/Coating Liquid C1) to form an laminated layer-forming coating liquid. The results are shown in Table 1. The laminated film had good electrical conductivity, antifouling properties, transparency, inspection efficiency, oligomer precipitation-preventing properties, and the like.

Example 3

A laminated PET film was obtained using the process of Example 1, except that the laminated layer-forming coating liquid shown below was used in place of that of Example 1.

Laminated Layer-Forming Coating Liquid

Coating Liquids A1, B1 and C1 used were the same as those in Example 1.

Coating Liquid D1: an aqueous coating liquid of colloidal silica with an average particle size of 45 nm.

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquids C1 and D1 were mixed in a solid weight ratio of 100/25/3 (Aged Coating Liquid 2/Coating Liquid C1/Coating Liquid D1) to form an laminated layer-forming coating liquid. The results are shown in Table 1. The laminated film had good electrical conductivity, antifouling properties, transparency, inspection efficiency, oligomer precipitation-preventing properties, and the like.

Example 4

A laminated PET film was obtained using the process of Example 1, except that PET pellets containing 0.06% by weight of silica particles with an average particle size of 1.5 μm (intrinsic viscosity: 0.63 dl/g) and the laminated layer-forming coating liquid shown below were used instead.

Laminated Layer-Forming Coating Liquid

Coating Liquids A1, B1 and C1 used were the same as those in Example 1.

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C1 were then mixed in a solid weight ratio of 100/25 (Aged Coating Liquid 2/Coating Liquid C1) to form an laminated layer-forming coating liquid. The results are shown in Table 1. The laminated film had good electrical conductivity, antifouling properties, transparency, inspection efficiency, oligomer precipitation-preventing properties, and the like.

Example 5

A laminated PET film was obtained using the process of Example 4, except that the laminated layer-forming coating liquid shown below was used in place of that of Example 4.

Laminated Layer-Forming Coating Liquid

Coating Liquids A1, B1 and C1 used were the same as those in Example 4.

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C1 were then mixed in a solid weight ratio of 100/30 (Aged Coating Liquid 2/Coating Liquid C1) to form an laminated layer-forming coating liquid. The results are shown in Table 1. The laminated film had good electrical conductivity, antifouling properties, transparency, testability, oligomer precipitation-preventing properties, and the like.

Example 6

A laminated PET film was obtained using the process of Example 4, except that the laminated layer-forming coating liquid shown below was used in place of that of Example 4.

Laminated Layer-Forming Coating Liquid

Coating Liquids A1, B1 and C1 used were the same as those in Example 4.

Coating Liquids A1 and B1 were mixed in a solid weight ratio of 40/60 (Coating Liquid A1/Coating Liquid B1), and the mixture was aged at room temperature for 5 days (the product is shortly named Aged Coating Liquid 3). Aged Coating Liquid 3 and Coating Liquid C1 were then mixed in a solid weight ratio of 100/15 (Aged Coating Liquid 3/Coating Liquid C1) to form an laminated layer-forming coating liquid. The results are shown in Table 1. The laminated film had good electrical conductivity, antifouling properties, transparency, inspection efficiency, oligomer precipitation-preventing properties, and the like.

Example 7

A laminated PET film was obtained using the process of Example 4, except that the laminated layer-forming coating liquid shown below was used in place of that of Example 4.
Laminated Layer-Forming Coating Liquid
Coating Liquids A1 and B1 used were the same as those in Example 4.
Coating Liquid C2: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| stearyl methacrylate (with a long chain alkyl group of 18 carbon atoms) | 65% by weight |
| methacrylic acid | 25% by weight |
| 2-hydroxyethyl methacrylate | 10% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C2 were then mixed in a solid weight ratio of 100/20 (Aged Coating Liquid 2/Coating Liquid C2) to form an laminated layer-forming coating liquid. The results are shown in Table 1. The laminated film had good electrical conductivity, antifouling properties, transparency, inspection efficiency, oligomer precipitation-preventing properties, and the like.

Example 8

A laminated PET film was obtained using the process of Example 4, except that the laminated layer-forming coating liquid shown below was used in place of that of Example 4.
Laminated Layer-Forming Coating Liquid
Coating Liquids A1 and B1 used were the same as those in Example 4.
Coating Liquid C3: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| lauryl methacrylate (with a long chain alkyl group of 18 carbon atoms) | 70% by weight |
| Methacrylic acid | 25% by weight |
| 2-hydroxyethyl methacrylate | 5% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C3 were then mixed in a solid weight ratio of 100/40 (Aged Coating Liquid 2/Coating Liquid C3) to form an laminated layer-forming coating liquid. The results are shown in Table 1. The laminated film had good electrical conductivity, antifouling properties, transparency, inspection efficiency, oligomer precipitation-preventing properties, and the like.

Example 9

A laminated PET film was obtained using the process of Example 4, except that the laminated layer-forming coating liquid shown below was used in place of that of Example 4.
Laminated Layer-Forming Coating Liquid
Coating Liquids A1 and B1 used were the same as those in Example 4.
Coating Liquid C3: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| lauryl methacrylate (with a long chain alkyl group of 18 carbon atoms) | 70% by weight |
| methacrylic acid | 25% by weight |
| 2-hydroxyethyl methacrylate | 5% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C3 were then mixed in a solid weight ratio of 100/100 (Aged Coating Liquid 2/Coating Liquid C3) to form an laminated layer-forming coating liquid. The results are shown in Table 1. The laminated film had good electrical conductivity, antifouling properties, transparency, inspection efficiency, oligomer precipitation-preventing properties, and the like.

Example 10

A laminated PET film was obtained using the process of Example 4, except that the laminated layer-forming coating liquid shown below was used in place of that of Example 4.
Laminated Layer-Forming Coating Liquid
Coating Liquids A1 and B1 used were the same as those in Example 4.
Coating Liquid C4: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with a long chain alkyl group of 22 carbon atoms) | 62% by weight |

| Copolymerization Components | |
|---|---|
| lauryl methacrylate (with a long chain alkyl group of 12 carbon atoms) | 3% by weight |
| methacrylic acid | 25% by weight |
| 2-hydroxyethyl methacrylate | 10% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C4 were then mixed in a solid weight ratio of 100/20 (Aged Coating Liquid 2/Coating Liquid C4) to form an laminated layer-forming coating liquid. The results are shown in Table 1. The laminated film had good electrical conductivity, antifouling properties, transparency, inspection efficiency, oligomer precipitation-preventing properties, and the like.

Example 11

A laminated PET film was obtained using the process of Example 4, except that the laminated layer-forming coating liquid shown below was used in place of that of Example 4.
Laminated Layer-Forming Coating Liquid
Coating Liquid A1 used was the same as that in Example 4.
Coating Liquid B2: an aqueous coating liquid in which a sorbitol polyglycidyl ether type epoxy crosslinking agent (DENACOL EX-614B manufactured by Nagase ChemteX Corporation, with a molecular weight of about 550, a weight per epoxy equivalent of 173 and a water solubility of 94%) is dissolved in water.
Coating Liquid C4 used was the same as that in Example 9.
Coating Liquids A1 and B2 were mixed in a solid weight ratio of 25/75 (Coating Liquid A1/Coating Liquid B2), and the mixture was aged at room temperature for 5 days (the product is shortly named Aged Coating Liquid 4). Aged Coating Liquid 4 and Coating Liquid C4 were then mixed in a solid weight ratio of 100/20 (Aged Coating Liquid 4/Coating Liquid C4) to form an laminated layer-forming coating liquid. The results are shown in Table 1. The laminated film had good electrical conductivity, antifouling properties, transparency, inspection efficiency, oligomer precipitation-preventing properties, and the like.

Example 12

A laminated PET film was obtained using the process of Example 1, except that particle-free PET pellets (intrinsic viscosity: 0.65 dl/g) and the laminated layer-forming coating liquid shown below were used instead.
Laminated Layer-Forming Coating Liquid
Coating Liquids A1, B1 and C1 used were the same as those in Example 1.
Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C1 were then mixed in a solid weight ratio of 100/20 (Aged Coating Liquid 2/Coating Liquid C1) to form an laminated layer-forming coating liquid. The results are shown in Table 1. The laminated film had good electrical conductivity, antifouling properties, transparency, inspection efficiency, oligomer precipitation-preventing properties, and the like.

Example 13

A laminated PET film was obtained using the process of Example 4, except that the laminated layer-forming coating liquid shown below was used in place of that of Example 4.
Laminated Layer-Forming Coating Liquid
Coating Liquids A1 and B1 used were the same as those in Example 4.
Coating Liquid C5: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with a long chain alkyl group of 22 carbon atoms) | 62% by weight |
| lauryl methacrylate (with a long chain alkyl group of 18 carbon atoms) | 3% by weight |
| methacrylic acid | 25% by weight |
| 2-hydroxyethyl methacrylate | 10% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C5 were then mixed in a solid weight ratio of 100/20 (Aged Coating Liquid 2/Coating Liquid C5) to form an laminated layer-forming coating liquid. The results are shown in Table 1. The laminated film had good electrical conductivity, antifouling properties, transparency, inspection efficiency, oligomer precipitation-preventing properties, and the like.

Comparative Example 1

A laminated PET film was obtained using the process of Example 1, except that the laminated layer-forming coating liquid shown below was used in place of that of Example 1 and that the thickness of the coating layer was set at 0.08 μm.
Laminated Layer-Forming Coating Liquid
Coating Liquid E1: an aqueous coating liquid in which ammonium polystyrene sulfonate (with a weight average molecular weight of 65,000) is dissolved in water.
Coating Liquid F1: an aqueous coating liquid in which an acrylic resin with the copolymerization composition shown below (with a glass transition temperature of 42° C.) is dispersed in the form of particles in water (with an emulsion particle size of 50 nm).

| Copolymerization Components | |
|---|---|
| methyl methacrylate (with an alkyl chain of 1 carbon atom) | 62% by weight |
| ethyl acrylate (with an alkyl chain of 2 carbon atoms) | 35% by weight |
| acrylic acid | 2% by weight |
| N-methylolacrylamide | 1% by weight |

Coating Liquids E1 and F1 were mixed in a solid weight ratio of 20/80 (Coating Liquid E1/Coating Liquid F1) to form an laminated layer-forming coating liquid. The results are shown in Table 2. The laminated film had very poor electrical conductivity and anti-fouling properties.

Comparative Example 2

A laminated PET film was obtained using the process of Example 1, except that the laminated layer-forming coating liquid shown below was used in place of that of Example 1.
Laminated Layer-Forming Coating Liquid Coating Liquid A1 used was the same as that in Example 1.

Coating Liquid B3: an aqueous coating liquid in which a polyglycerol polyglycidyl ether type epoxy crosslinking agent (DENACOL EX-512 manufactured by Nagase ChemteX Corporation, with a molecular weight of about 630, a weight per epoxy equivalent of 168 and a water solubility of 100%) is dissolved in water.

Coating Liquid G1: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| 2-ethylhexyl methacrylate (with a long chain alkyl group of 8 carbon atoms) | 70% by weight |
| methacrylic acid | 25% by weight |
| 2-hydroxyethyl methacrylate | 5% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid G1 were then mixed in a solid weight ratio of 100/20 (Aged Coating Liquid 5/Coating Liquid G1) to form an laminated layer-forming coating liquid. The results are shown in Table 2. The laminated film had poor antifouling properties.

Comparative Example 3

A laminated PET film was obtained using the process of Example 1, except that PET pellets containing 14% by weight of titanium oxide and 0.5% by weight of silica particles with an average particle size of 4 μm (intrinsic viscosity: 0.62 dl/g) and the laminated layer-forming coating liquid shown below were used instead. The resulting PET film had a thickness of 188 μm, in which the laminated layer had a thickness of 0.025 μm. The results are shown in Table 2. The electrical conductivity and the antifouling properties were good, but masking properties were produced by titanium oxide so that no transparency was achieved. The resulting film was not acceptable as a polarizing plate-protective film. The amount of the internal contaminant was also unmeasurable.
Laminated Layer-Forming Coating Liquid Coating Liquid A1 used was the same as that in Example 1.

Coating Liquid B3: an aqueous coating liquid in which a polyglycerol polyglycidyl ether type epoxy crosslinking agent (DENACOL EX-512 manufactured by Nagase ChemteX Corporation, with a molecular weight of about 630, a weight per epoxy equivalent of 168 and a water solubility of 100%) is dissolved in water.

Coating Liquid C1 used was the same as that in Example 1.

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/20 (Aged Coating Liquid 5/Coating Liquid C1) to form an laminated layer-forming coating liquid.

Comparative Example 4

A laminated PET film was obtained using the process of Example 1, except that PET pellets containing 0.2% by weight of silica particles with an average particle size of 1.5 μm (intrinsic viscosity: 0.63 dl/g) and the laminated layer-forming coating liquid shown below were used instead. The resulting PET film had a thickness of 7 μm, in which the laminated layer had a thickness of 0.025 μm. The results are shown in Table 2. The electrical conductivity and the antifouling properties were good, while the transparency and the inspection efficiency were poor. The transparency was poor, and the amount of the internal contaminant was also at unmeasurable level.
Laminated Layer-Forming Coating Liquid Coating Liquid A1 used was the same as that in Example 1.

Coating Liquid B3: an aqueous coating liquid in which a polyglycerol polyglycidyl ether type epoxy crosslinking agent (DENACOL EX-512 manufactured by Nagase ChemteX Corporation, with a molecular weight of about 630, a weight per epoxy equivalent of 168 and a water solubility of 100%) is dissolved in water.

Coating Liquid C1 used was the same as that in Example 1.

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/20 (Aged Coating Liquid 5/Coating Liquid C1) to form an laminated layer-forming coating liquid.

Comparative Example 5

A laminated PET film was obtained using the process of Example 4, except that the laminated layer-forming coating liquid shown below was used in place of that of Example 4.
Laminated Layer-Forming Coating Liquid Coating Liquids A1, B1 and C1 used were the same as those in Example 4.

Coating Liquids A1 and B1 were mixed in a solid weight ratio of 40/60 (Coating Liquid A1/Coating Liquid B1), and the mixture was aged at room temperature for 5 days (the product is shortly named Aged Coating Liquid 3). Aged Coating Liquid 3 and Coating Liquid C1 were then mixed in a solid weight ratio of 100/10 (Aged Coating Liquid 3/Coating Liquid C1) to form an laminated layer-forming coating liquid. The results are shown in Table 1. The laminated film had poor antifouling properties.

Comparative Example 6

A laminated PET film was obtained using the process of Example 4, except that the laminated layer-forming coating liquid shown below was used in place of that of Example 4.
Laminated Layer-Forming Coating Liquid Coating Liquids A1 and B1 used were the same as those in Example 4.

Coating Liquid G2: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| lauryl methacrylate (with a long chain alkyl group of 12 carbon atoms) | 70% by weight |
| methacrylic acid | 25% by weight |
| 2-hydroxyethyl methacrylate | 5% by weight |

Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid G2 were then mixed in a solid weight ratio of 100/20 (Aged Coating Liquid 2/Coating Liquid G2) to form an laminated layer-forming coating liquid. The results are shown in Table 1. The laminated film had poor antifouling properties.

formed for 1 hour, and the esterification product was transferred to a polycondensation tank. Subsequently, 0.01 parts by weight of ethyl(diethylphosphono)acetate was added to the esterification product-containing polycondensation tank, and 0.04 parts by weight of magnesium acetate tetrahydrate and a polymerization catalyst of antimony trioxide (manufactured by SUMITOMO METAL MINING CO., LTD.) in such an amount that the resulting polyester would contain 400 ppm of the antimony atom were further added thereto. An additive of silicon dioxide particles with an average particle size of 2.3 μm and a specific surface area of 300 m²/g was added in such an amount that the polyester would contain 0.04% by weight thereof. Thereafter, while the oligomer was stirred at 30 rpm, the reaction system was heated from 250° C. to 285° C. over 60 minutes, and the pressure was reduced to 40 Pa. The time period to reach the final pressure was 60 minutes. At the time when a certain stirring torque was reached, the reaction system was subjected to nitrogen purging and returned to atmo-

TABLE 1

| | Composition of Laminated layer | | Number of Carbon | | | Conductivity | | | Contact Angle with | Haze | | Internal Contaminants |
|---|---|---|---|---|---|---|---|---|---|---|---|---|
| | Type | Solid Weight Ratio | Atoms in Long Chain Alkyl | SRa (nm) | SRz (nm) | 65% RH (Ω/□) | 20% RH (Ω/□) | Water Resistance (Ω/□) | Water Droplet (degrees) | Haze (%) | after Heating (%) | of at Least 100 μm (/m²) |
| Example 1 | A1/B1/C1 | 10/90/20 | 22 | 14 | 510 | $8 \times 10^5$ | $9 \times 10^5$ | $8 \times 10^5$ | 100 | 1.0 | 1.1 | 2 |
| Example 2 | A1/B1/C1 | 25/75/20 | 22 | 14 | 510 | $5 \times 10^4$ | $5 \times 10^4$ | $6 \times 10^4$ | 100 | 0.9 | 1.0 | 2 |
| Example 3 | A1/B1/C1/D1 | 25/75/25/3 | 22 | 15 | 510 | $6 \times 10^4$ | $6 \times 10^4$ | $6 \times 10^4$ | 98 | 1.1 | 1.1 | 2 |
| Example 4 | A1/B1/C1 | 25/75/25 | 22 | 30 | 800 | $5 \times 10^4$ | $5 \times 10^4$ | $5 \times 10^4$ | 100 | 3.1 | 3.1 | 2 |
| Example 5 | A1/B1/C1 | 25/75/30 | 22 | 30 | 800 | $7 \times 10^4$ | $7 \times 10^4$ | $7 \times 10^4$ | 103 | 3.1 | 3.1 | 2 |
| Example 6 | A1/B1/C1 | 40/60/15 | 22 | 30 | 800 | $1 \times 10^4$ | $2 \times 10^4$ | $2 \times 10^4$ | 95 | 3.2 | 3.9 | 2 |
| Example 7 | A1/B1/C2 | 25/75/20 | 18 | 30 | 800 | $7 \times 10^4$ | $7 \times 10^4$ | $8 \times 10^4$ | 97 | 3.0 | 3.1 | 2 |
| Example 8 | A1/B1/C3 | 25/75/40 | 18 | 30 | 800 | $7 \times 10^4$ | $7 \times 10^4$ | $8 \times 10^4$ | 100 | 3.0 | 3.0 | 2 |
| Example 9 | A1/B1/C3 | 25/75/100 | 18 | 30 | 800 | $1 \times 10^6$ | $1 \times 10^6$ | $1 \times 10^6$ | 105 | 3.0 | 3.0 | 2 |
| Example 10 | A1/B1/C4 | 25/75/20 | 22 and 12 | 30 | 800 | $8 \times 10^4$ | $8 \times 10^4$ | $8 \times 10^4$ | 100 | 3.0 | 3.0 | 2 |
| Example 11 | A1/B2/C4 | 25/75/20 | 22 and 12 | 30 | 800 | $1 \times 10^5$ | $2 \times 10^5$ | $1 \times 10^5$ | 100 | 3.0 | 3.0 | 2 |
| Example 12 | A1/B1/C1 | 25/75/20 | 22 | 6 | 70 | $5 \times 10^4$ | $6 \times 10^4$ | $6 \times 10^4$ | 100 | 0.3 | 0.4 | 0 |
| Example 13 | A1/B1/C5 | 25/75/20 | 22 and 18 | 6 | 70 | $8 \times 10^4$ | $8 \times 10^4$ | $9 \times 10^4$ | 101 | 0.3 | 0.4 | 0 |

TABLE 2

| | Composition of Laminated layer | | Number of Carbon | | | Conductivity | | | Contact Angle with Water Droplet (degree) | Haze | | Internal Contaminants |
|---|---|---|---|---|---|---|---|---|---|---|---|---|
| | Type | Solid Weight Ratio | Atoms in Long Chain Alkyl | SRa (nm) | SRz (nm) | 65% RH (Ω/□) | 20% RH (Ω/□) | Water Resistance (Ω/□) | | Haze (%) | after Heating (%) | of at Least 100 μm (/m²) |
| Comparative Example 1 | E1/F1 | 20/80 | (None) | 14 | 510 | $1 \times 10^{10}$ | $3 \times 10^{15}$ | $5 \times 10^{12}$ | 50 | 1.2 | 1.3 | 2 |
| Comparative Example 2 | A1/B3/G1 | 25/75/20 | 8 | 14 | 510 | $7 \times 10^4$ | $9 \times 10^4$ | $8 \times 10^4$ | 65 | 1.0 | 1.8 | 2 |
| Comparative Example 3 | A1/B3/C1 | 25/75/20 | 22 | 83 | 900 | $5 \times 10^4$ | $6 \times 10^4$ | $6 \times 10^4$ | 100 | | Unmeasurable | |
| Comparative Example 4 | A1/B3/C1 | 25/75/20 | 22 | 100 | 1100 | $5 \times 10^4$ | $5 \times 10^4$ | $6 \times 10^4$ | 100 | 10 | 10 | Unmeasurable |
| Comparative Example 5 | A1/B1/C1 | 40/60/10 | 22 | 30 | 800 | $1 \times 10^4$ | $2 \times 10^4$ | $2 \times 10^4$ | 93 | 3.2 | 4.0 | 2 |
| Comparative Example 6 | A1/B1/G2 | 25/75/20 | 12 | 30 | 800 | $8 \times 10^4$ | $8 \times 10^5$ | $1 \times 10^5$ | 90 | 3.0 | 3.4 | 2 |

Example 14

A hundred kg of high-purity terephthalic acid and 45 kg of ethylene glycol slurry were gradually fed over 4 hours to an esterification reactor which had been previously fed with about 123 kg of bis(hydroxyethyl)terephthalate and kept at a temperature of 250° C. under a pressure of $1.2 \times 10^5$ Pa. After the feeding was completed, the esterification was further perspheric pressure so that the polycondensation reaction was stopped. The product was then discharged in the form of a strand into cold water at 20° C. and immediately cut into pieces so that polyester pellets were obtained. The time from the start of the pressure reduction to the achievement of the certain stirring torque was 3 hours.

The resulting polyester pellets had a intrinsic viscosity of 0.62 dl/g, a carboxyl end group content of 40 equivalents/ton, a glass transition temperature (Tg) of 78° C., and a cyclic trimer content of 1.1% by weight.

The polyester pellets were dried under vacuum to have a moisture content of 20 ppm and then fed into an extruder and melted at a temperature of 285° C. The melt was then filtered through an 8 μm cut-off stainless steel fiber sintered filter (FSS) and then extruded in the form of a sheet from a T-shaped die slit with a lip gap of 3.5 mm. The sheet was wound around a specular casting drum with a surface temperature of 25° C. using an electrostatic casting process and cooled to be solidified. The resulting unstretched film was heated to a temperature of 92° C. and stretched at a draw ratio of 3.5 in the longitudinal direction to form a uniaxially-oriented film. The uniaxially-oriented film was subjected to corona discharge treatment in the air to have a wet tensile strength of at least 50 mN/m, and the laminated layer-forming coating liquid described below was applied to the treated surface. The uniaxially-oriented film coated with the laminated layer-forming coating liquid was introduced into a pre-heating zone, while being held with a clip, and dried at a temperature of 115° C. The film was then continuously stretched at a draw ratio of 3.8 in the width direction in a heating zone at a temperature of 100° C. and further heat-treated in a heating zone at a temperature of 225° C. for 2.6 seconds and at a temperature of 230° C. for 2.6 seconds. As a result of the above process, a laminated PET film was obtained, in which crystalline orientation was completed. Before taken up, dust was removed from both side surfaces of the film using a dust remover. The resulting PET film had a thickness of 38 μm, in which the laminated layer had a thickness of 0.025 μm. The results are shown in Tables 3 and 4. The results were good with respect to electrical conductivity, releasability, internal contaminants of at least 100 μm, haze, thickness variation, and deposited contaminants of at least 100 μm.

Laminated Layer-Forming Coating Liquid

Coating Liquid A1: an aqueous coating liquid of a complex of poly-3,4-ethylenedioxythiophene/polystyrene sulfonic acid (Baytron P manufactured by Bayer/H. C. Starck (Germany)).

Coating Liquid B3: an aqueous coating liquid in which a polyglycerol polyglycidyl ether type epoxy crosslinking agent (DENACOL EX-512 manufactured by Nagase ChemteX Corporation, with a molecular weight of about 630, a weight per epoxy equivalent of 168 and a water solubility of 100%) is dissolved in water.

Coating Liquid C2: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| stearyl methacrylate (with a long chain alkyl group of 18 carbon atoms) | 65% by weight |
| methacrylic acid | 25% by weight |
| 2-hydroxyethyl methacrylate | 10% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C2 were then mixed in a solid weight ratio of 100/25 (Aged Coating Liquid 5/Coating Liquid C2) to form an laminated layer-forming coating liquid. The results are shown in Tables 3 and 4. The results were good with respect to polarization inspection efficiency, stripe-like defects, evaluation of separation electrification, and glossiness.

Example 15

A laminated PET film was obtained using the process of Example 14, except that PET pellets containing 0.07% by weight of silicon dioxide particles with an average particle size of 2.3 μm (intrinsic viscosity: 0.62 dl/g) were used instead. The results are shown in Tables 3 and 4. The results were good with respect to polarization inspection efficiency, stripe-like defects, evaluation of separation electrification, and glossiness.

Example 16

A laminated PET film was obtained using the process of Example 14, except that a titanium-based polymerization catalyst was used for the polymerization when the PET pellets were produced. The results are shown in Tables 3 and 4. The results were good with respect to polarization inspection efficiency, stripe-like defects, evaluation of separation electrification, and glossiness.

Example 17

A laminated PET film was obtained using the process of Example 14, except that a simultaneous biaxial stretching process was used in place of the sequential biaxial stretching process. The results are shown in Tables 3 and 4. The results were good with respect to polarization inspection efficiency, stripe-like defects, evaluation of separation electrification, and glossiness.

Example 18

A laminated PET film was obtained using the process of Example 14, except that no dust remover was used. The results are shown in Tables 3 and 4. The results were good with respect to polarization inspection efficiency, stripe-like defects, evaluation of separation electrification, and glossiness.

Example 19

A laminated PET film was obtained using the process of Example 14, except that PET pellets containing 0.06% by weight of colloidal silica with an average particle size of 2.3 μm and 0.03% by weight of colloidal silica with an average particle size of 3.8 μm (intrinsic viscosity: 0.63 dl/g) were used instead. The results are shown in Tables 3 and 4. The results were good with respect to polarization inspection efficiency, stripe-like defects, evaluation of separation electrification, and glossiness.

Example 20

A laminated PET film was obtained using the process of Example 14, except that particle-free PET pellets (intrinsic viscosity: 0.63 dl/g) were used instead. The results are shown in Tables 3 and 4. The results were good with respect to polarization inspection efficiency, stripe-like defects, evaluation of separation electrification, and glossiness.

Comparative Example 7

A laminated PET film was obtained using the process of Example 14, except that the laminated layer-forming coating liquid shown below was used in place of that of Example 14 and that the thickness of the coating layer was set at 0.08 μm.

Laminated Layer-Forming Coating Liquid

Coating Liquid E1: an aqueous coating liquid in which ammonium polystyrene sulfonate (with a weight average molecular weight of 65,000) is dissolved in water.

Coating Liquid F1: an aqueous coating liquid in which an acrylic resin with the copolymerization composition shown below (with a glass transition temperature of 42° C.) is dispersed in the form of particles in water (with an emulsion particle size of 50 nm).

| Copolymerization Components | |
|---|---|
| methyl methacrylate (with an alkyl chain of 1 carbon atom) | 62% by weight |
| ethyl acrylate (with an alkyl chain of 2 carbon atoms) | 35% by weight |
| acrylic acid | 2% by weight |
| N-methylolacrylamide | 1% by weight |

Coating Liquids E1 and F1 were mixed in a solid weight ratio of 20/80 (Coating Liquid E1/Coating Liquid F1) to form an laminated layer-forming coating liquid. The results are shown in Tables 3 and 4. The result was poor with respect to evaluation of separation electrification.

Comparative Example 8

A laminated PET film was obtained using the process of Example 14, except that a 14 μm cut-off stainless steel powder sintered filter (PSS) was used in place of the 8 μm cut-off stainless steel fiber sintered filter (FSS). The results are shown in Tables 3 and 4. The result was poor with respect to polarization inspection efficiency.

TABLE 3

| | Layer Composition of Base Film | Filter Type | Slit Lip Gap | Dust Remover | Stretching Method | Coating Liquid Formulation Type | Mixing Ratio of Effective Components |
|---|---|---|---|---|---|---|---|
| Example 14 | Monolayer 38 μm Silicon Dioxide (2.3 μm) 0.04 wt % | FSS 8 μm | 3.5 mm | ON | Sequential Biaxial Stretching | A1/B3/C2 | 25/75/25 |
| Example 15 | Monolayer 38 μm Silicon Dioxide (2.3 μm) 0.07 wt % | FSS 8 μm | 3.5 mm | ON | Sequential Biaxial Stretching | A1/B3/C2 | 25/75/25 |
| Example 16 | Monolayer 38 μm Silicon Dioxide (2.3 μm) 0.04 wt % *Using Titanium-Based Polymerization Catalyst | FSS 8 μm | 3.5 mm | ON | Sequential Biaxial Stretching | A1/B3/C2 | 25/75/25 |
| Example 17 | Monolayer 38 μm Silicon Dioxide (2.3 μm) 0.04 wt % | FSS 8 μm | 3.5 mm | ON | Simultaneous Biaxial Stretching | A1/B3/C2 | 25/75/25 |
| Example 18 | Monolayer 38 μm Silicon Dioxide (2.3 μm) 0.04 wt % | FSS 8 μm | 3.5 mm | OFF | Sequential Biaxial Stretching | A1/B3/C2 | 25/75/25 |
| Example 19 | Monolayer 38 μm Silicon Dioxide (2.3 μm) 0.06 wt % Silicon Dioxide (3.8 μm) 0.03 wt % | FSS 8 μm | 3.5 mm | ON | Sequential Biaxial Stretching | A1/B3/C2 | 25/75/25 |
| Example 20 | Monolayer 38 μm Particle-Free | FSS 8 μm | 3.5 mm | ON | Sequential Biaxial Stretching | A1/B3/C2 | 25/75/25 |
| Comparative Example 7 | Monolayer 38 μm Silicon Dioxide (2.3 μm) 0.04 wt % | FSS 8 μm | 3.5 mm | ON | Sequential Biaxial Stretching | E1/F1 | 20/80 |
| Comparative Example 8 | Monolayer 38 μm Silicon Dioxide (2.3 μm) 0.04 wt % | PSS 14 μm | 3.5 mm | ON | Sequential Biaxial Stretching | A1/B3/C2 | 25/75/25 |

TABLE 4

| | Surface Roughness (nm) | | Conductivity ($\Omega/\square$) | Internal Contaminants of at Least 100 μm (/m$^2$) | Haze (%) | Accidental Thickness Variation of at Least 0.3 μm (/m) | Deposited Contaminants of at Least 100 μm (/1,000 m$^2$) | Polarization Inspection efficiency | Stripe-Like Defects | Evaluation of Separation Electrification | Glossiness |
|---|---|---|---|---|---|---|---|---|---|---|---|
| | Sra | SRz | | | | | | | | | |
| Example 14 | 30 | 1009 | $7 \times 10^4$ | 2 | 2.9 | 0 | 3 | Excellent | Good | Good | Good |
| Example 15 | 40 | 1425 | $7 \times 10^4$ | 3 | 3.0 | 0 | 4 | Excellent | Good | Good | Good |
| Example 16 | 29 | 1045 | $7 \times 10^4$ | 1 | 3.1 | 0 | 2 | Excellent | Good | Good | Good |
| Example 17 | 30 | 1023 | $7 \times 10^4$ | 1 | 3.0 | 0 | 2 | Excellent | Good | Good | Good |
| Example 18 | 28 | 980 | $7 \times 10^4$ | 2 | 3.1 | 0 | 20 | Good | Good | Good | Good |
| Example 19 | 45 | 1635 | $7 \times 10^4$ | 2 | 5.6 | 0 | 2 | Excellent | Good | Good | Good |
| Example 20 | 6 | 53 | $7 \times 10^4$ | 0 | 0.5 | 0 | 2 | Excellent | Good | Good | Excellent |
| Comparative Example 7 | 32 | 110 | $1 \times 10^{10}$ | 1 | 3.0 | 0 | 2 | Excellent | Good | Poor | Good |
| Comparative Example 8 | 30 | 999 | $7 \times 10^4$ | 50 | 2.9 | 0 | 3 | Poor | Good | Good | Good |

Example 21

A hundred kg of high-purity terephthalic acid and 45 kg of ethylene glycol slurry were gradually fed over 4 hours to an esterification reactor which had been previously fed with about 123 kg of bis(hydroxyethyl)terephthalate and kept at a temperature of 250° C. under a pressure of $1.2 \times 10^5$ Pa. After the feeding was completed, the esterification was further performed for 1 hour, and the esterification product was transferred to a polycondensation tank. Subsequently, 0.01 parts by weight of ethyl(diethylphosphono)acetate was added to the esterification product-containing polycondensation tank, and 0.04 parts by weight of magnesium acetate tetrahydrate and a polymerization catalyst of antimony trioxide (manufactured by SUMITOMO METAL MINING CO., LTD.) in such an amount that the resulting polyester would contain 400 ppm of the antimony atom were further added thereto. An additive of silica particles with an average particle size of 0.4 μm was added in such an amount that the polyester would contain 0.015% by weight thereof, and another additive of silica particles with an average particle size of 1.5 μm was added in such an amount that the polyester would contain 0.006% by weight thereof. Thereafter, while the oligomer was stirred at 30 rpm, the reaction system was heated from 250° C. to 285° C. over 60 minutes, and the pressure was reduced to 40 Pa. The time period to reach the final pressure was 60 minutes. At the time when a certain stirring torque was reached, the reaction system was subjected to nitrogen purging and returned to atmospheric pressure so that the polycondensation reaction was stopped. The product was then discharged in the form of a strand into cold water at 20° C. and immediately cut into pieces so that polyester pellets were obtained. The time from the start of the pressure reduction to the achievement of the certain stirring torque was 3 hours.

The resulting polyester pellets had a intrinsic viscosity of 0.63 dl/g, a carboxyl end group content of 40 equivalents/ton, a glass transition temperature (Tg) of 78° C., and a cyclic trimer content of 1.1% by weight.

The polyester pellets were dried under vacuum to have a moisture content of 20 ppm and then fed into an extruder and melted at a temperature of 285° C. The melt was then filtered through an 8 μm cut-off stainless steel fiber sintered filter (FSS) and then extruded in the form of a sheet from a T-shaped die slit with a lip gap of 3.5 mm. The sheet was wound around a specular casting drum with a surface temperature of 25° C. using an electrostatic casting process and cooled to be solidified. The resulting unstretched film was heated to a temperature of 92° C. and stretched at a draw ratio of 3.3 in the longitudinal direction to form a uniaxially-oriented film. The uniaxially-oriented film was subjected to corona discharge treatment in the air to have a wet tensile strength of 55 mN/m, and the laminated layer-forming coating liquid described below was applied to the treated surface. The uniaxially-oriented film coated with the laminated layer-forming coating liquid was introduced into a preheating zone, while being held with a clip, and dried at a temperature of 95° C., and then continuously stretched at a draw ratio of 3.5 in the width direction in a heating zone at a temperature of 100° C. The film was further heat-treated in a heating zone at a temperature of 225° C. to give a laminated PET film in which crystalline orientation was completed. The resulting PET film had a thickness of 38 μm, in which the laminated layer had a thickness of 0.025 μm. The results are shown in Tables 5 and 6. The results were good with respect to electrical conductivity, releasability, oligomer precipitation-preventing properties, and gloss Laminated Layer-Forming Coating Liquid Coating Liquid A1: an aqueous coating liquid of a complex of poly-3,4-ethylenedioxythiophene/polystyrene sulfonic acid (Baytron P manufactured by Bayer/H. C. Starck (Germany)).

Coating Liquid B3: an aqueous coating liquid in which a polyglycerol polyglycidyl ether type epoxy crosslinking agent (DENACOL EX-512 manufactured by Nagase ChemteX Corporation, with a molecular weight of about 630, a weight per epoxy equivalent of 168 and a water solubility of 100%) is dissolved in water.

Coating Liquid C2: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| stearyl methacrylate (with a long chain alkyl group of 18 carbon atoms) | 65% by weight |
| methacrylic acid | 25% by weight |
| 2-hydroxyethyl methacrylate | 10% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C2 were then mixed in a solid weight ratio of 100/20 (Aged Coating Liquid 5/Coating Liquid C2) to form an laminated layer-forming coating liquid. In this process, the solid weight ratio between the respective coating liquids was as follows: Coating Liquid A1/Coating Liquid B3/Coating Liquid C2=25/75/20.

Example 22

A laminated PET film was obtained using the process of Example 21, except that PET pellets containing 0.06% by weight of silica particles with an average particle size of 1.5 μm (intrinsic viscosity: 0.63 dl/g) and the laminated layer-forming coating liquid shown below were used instead and that the thickness of the PET film was set at 16 μm.

Laminated Layer-Forming Coating Liquid

Coating Liquids A1 and B3 used were the same as those in Example 21.

Coating Liquid C1: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with a long chain alkyl group of 22 carbon atoms) | 65% by weight |
| methacrylic acid | 25% by weight |
| 2-hydroxyethyl methacrylate | 10% by weight |

Coating Liquids A1 and B3 were mixed in a solid weight ratio of 40/60 (Coating Liquid A1/Coating Liquid B3), and the mixture was aged at room temperature for 5 days (the product is shortly named Aged Coating Liquid 6). Aged Coating Liquid 6 and Coating Liquid C1 were then mixed in a solid weight ratio of 100/15 (Aged Coating Liquid 6/Coating Liquid C1) to form an laminated layer-forming coating liquid. The results are shown in Tables 5 and 6. The laminated film had good electrical conductivity, releasability, oligomer precipitation-preventing properties, and glossiness.

Example 23

A laminated PET film was obtained using the process of Example 22, except that the laminated layer-forming coating liquid shown below was used in place of that of Example 22.
Laminated Layer-Forming Coating Liquid
Coating Liquids A1, B3 and C1 used were the same as those in Example 22.
Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/20 (Aged Coating Liquid 5/Coating Liquid C1) to form an laminated layer-forming coating liquid. The results are shown in Tables 5 and 6. The laminated film had good electrical conductivity, releasability, oligomer precipitation-preventing properties, and glossiness.

Example 24

A laminated PET film was obtained using the process of Example 22, except that the laminated layer-forming coating liquid shown below was used in place of that of Example 22.
Laminated Layer-Forming Coating Liquid
Coating Liquids A1, B3 and C1 used were the same as those in Example 22.
Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquids C1 were mixed in a solid weight ratio of 100/40 (Aged Coating Liquid 5/Coating Liquid C1) to form an laminated layer-forming coating liquid. The results are shown in Tables 5 and 6. The laminated film had good electrical conductivity, releasability, oligomer precipitation-preventing properties, and glossiness.

Example 25

A laminated PET film was obtained using the process of Example 22, except that the laminated layer-forming coating liquid shown below was used in place of that of Example 22.
Laminated Layer-Forming Coating Liquid
Coating Liquids A1, B3 and C1 used were the same as those in Example 22.
Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/100 (Aged Coating Liquid 5/Coating Liquid C1) to form an laminated layer-forming coating liquid. The results are shown in Tables 5 and 6. The laminated film had good electrical conductivity, releasability, oligomer precipitation-preventing properties, and glossiness.

Example 26

A laminated PET film was obtained using the process of Example 22, except that particle-free PET pellets (intrinsic viscosity: 0.65 dl/g) and the laminated layer-forming coating liquid shown below were used instead and that the thickness of the PET film was set at 100 μm.
Laminated Layer-Forming Coating Liquid
Coating Liquids A1 and B3 used were the same as those in Example 22.
Coating Liquid C6: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with an alkyl chain of 22 carbon atoms) | 70% by weight |
| methacrylic acid | 30% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C6 were then mixed in a solid weight ratio of 100/20 (Aged Coating Liquid 5/Coating Liquid C6) to form an laminated layer-forming coating liquid. The results are shown in Tables 5 and 6. The laminated film had good electrical conductivity, releasability, oligomer precipitation-preventing properties, and glossiness.

Example 27

A laminated PET film was obtained using the process of Example 26, except that the laminated layer-forming coating liquid shown below was used in place of that of Example 26.
Laminated Layer-Forming Coating Liquid
Coating Liquids A1, B3 and C2 used were the same as those in Example 21.
Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C2 were then mixed in a solid weight ratio of 100/30 (Aged Coating Liquid 5/Coating Liquid C2) to form an laminated layer-forming coating liquid. The results are shown in Tables 5 and 6. The laminated film had good electrical conductivity, releasability, oligomer precipitation-preventing properties, and glossiness.

Example 28

A laminated PET film was obtained using the process of Example 26, except that the laminated layer-forming coating liquid shown below was used in place of that of Example 26.
Laminated Layer-Forming Coating Liquid
Coating Liquid A1 used was the same as that in Example 21.
Coating Liquid B1: an aqueous coating liquid in which a polyhydroxyalkane polyglycidyl ether type epoxy crosslinking agent (CR-5L manufactured by Dainippon Ink and Chemicals, Incorporated, with a weight per epoxy equivalent of 180 and a water solubility of 100%) was dissolved in water.
Coating Liquid C1 used was the same as that in Example 22.
Coating Liquids A1 and B1 were mixed in a solid weight ratio of 25/75 (Coating Liquid A1/Coating Liquid B1), and the mixture was aged at room temperature for 5 days (the product is shortly named Aged Coating Liquid 2). Aged Coating Liquid 2 and Coating Liquid C1 were then mixed in a solid weight ratio of 100/20 (Aged Coating Liquid 2/Coating Liquid C1) to form an laminated layer-forming coating liquid. The results are shown in Tables 5 and 6. The laminated film had good electrical conductivity, releasability, oligomer precipitation-preventing properties, and glossiness.

Example 29

A laminated PET film was obtained using the process of Example 28, except that a coating layer made of the polyester resin shown below was formed on the side opposite to the laminated layer-forming side by an in-line coating process at the same time that the laminated layer was formed. In this case, the surface roughness of the side where the coating layer was formed was as follows: SRa=5 nm and SRz=70 nm. The results are shown in Tables 5 and 6. The laminated film had good electrical conductivity, releasability, oligomer precipitation-preventing properties, and glossiness. In addition, when an oxidative polymerization type printing ink layer was formed on the polyester resin coating layer on the other side, the adhesiveness was good.
Coating Layer-Forming Coating Liquid A Dispersion of Polyester Resin in Water: an aqueous coating liquid in which a polyester resin made from the copolymerization components shown below is dispersed in the form of particles in water.

| Copolymerization Components | |
|---|---|
| terephthalic acid | 70% by mole |
| isophthalic acid | 23% by mole |
| 5-sodium sulfoisophthalate | 7% by mole |
| ethylene glycol | 70% by mole |
| Diethylene glycol | 30% by mole |

Example 30

A laminated PET film was obtained using the process of Example 21, except that PET pellets containing 0.016% by weight of silica particles with an average particle size of 1.5 μm (intrinsic viscosity: 0.63 dl/g) and the laminated layer-forming coating liquid shown below were used instead.
Laminated Layer-Forming Coating Liquid Coating Liquids A1 and B3 used were the same as those in Example 21.

Coating Liquid C1 used was the same as that in Example 22.

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/20 (Aged Coating Liquid 5/Coating Liquid C1) to form an laminated layer-forming coating liquid. The results are shown in Tables 5 and 6. The laminated film had good electrical conductivity, releasability, oligomer precipitation-preventing properties, and glossiness.

Comparative Example 9

A laminated PET film was obtained using the process of Example 21, except that the laminated layer-forming coating liquid shown below was used in place of that of Example 21 and that the thickness of the coating layer was set at 0.08/m.
Laminated Layer-Forming Coating Liquid Coating Liquid E1: an aqueous coating liquid in which ammonium polystyrene sulfonate (with a weight average molecular weight of 65,000) is dissolved in water.

Coating Liquid F1: an aqueous coating liquid in which an acrylic resin with the copolymerization composition shown below (with a glass transition temperature of 42° C.) is dispersed in the form of particles in water (with an emulsion particle size of 50 nm).

| Copolymerization Components | |
|---|---|
| methyl methacrylate (with an alkyl chain of 1 carbon atom) | 62% by weight |
| ethyl acrylate (with an alkyl chain of 2 carbon atoms) | 35% by weight |
| acrylic acid | 2% by weight |
| N-methylolacrylamide | 1% by weight |

Coating Liquids E1 and F1 were mixed in a solid weight ratio of 20/80 (Coating Liquid E1/Coating Liquid F1) to form an laminated layer-forming coating liquid. The results are shown in Tables 5 and 6. The laminated film had very poor electrical conductivity and releasability.

Comparative Example 10

A laminated PET film was obtained using the process of Example 21, except that the laminated layer-forming coating liquid shown below was used in place of that of Example 21.
Laminated Layer-Forming Coating Liquid Coating Liquids A1 and B3 used were the same as those in Example 21.

Coating Liquid G1: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| 2-ethylhexyl methacrylate (with a long chain alkyl group of 8 carbon atoms) | 70% by weight |
| methacrylic acid | 25% by weight |
| 2-hydroxyethyl methacrylate | 5% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid G1 were then mixed in a solid weight ratio of 100/20 (Aged Coating Liquid 5/Coating Liquid G1) to form an laminated layer-forming coating liquid. The results are shown in Tables 5 and 6. The laminated film had very poor releasability and oligomer precipitation-preventing properties.

Comparative Example 11

A laminated PET film was obtained using the process of Example 21, except that the laminated layer-forming coating liquid shown below was used in place of that of Example 21.

Laminated Layer-Forming Coating Liquid

Coating Liquids A1 and B3 used were the same as those in Example 21.

Coating Liquid G2: an aqueous coating liquid in which a long chain alkyl group-containing acrylic resin with the copolymerization composition shown below is dissolved in an aqueous solution containing 5% by weight of isopropyl alcohol and 5% by weight of n-butyl cellosolve.

| Copolymerization Components | |
|---|---|
| lauryl methacrylate (with a long chain alkyl group of 12 carbon atoms) | 70% by weight |
| methacrylic acid | 25% by weight |
| 2-hydroxyethyl methacrylate | 5% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid G2 were then mixed in a solid weight ratio of 100/20 (Aged Coating Liquid 5/Coating Liquid G2) to form an laminated layer-forming coating liquid. The results are shown in Tables 5 and 6. The laminated film had poor releasability.

Comparative Example 12

A laminated PET film was obtained using the process of Example 21, except that PET pellets containing 0.06% by weight of silica particles with an average particle size of 1.5 μm (intrinsic viscosity: 0.63 dl/g) and the laminated layer-forming coating liquid shown below were used instead and that the thickness of the PET film was set at 16 μm.

Laminated Layer-Forming Coating Liquid

Coating Liquids A1 and B3 used were the same as those in Example 21.

Coating Liquid C1: an aqueous coating liquid in which a long chain alkyl group-containing acrylic resin with the copolymerization composition shown below is dissolved in an aqueous solution containing 10% by weight of isopropyl alcohol and 5% by weight of n-butyl cellosolve.

| Copolymerization Components | |
|---|---|
| behenyl methacrylate (with a long chain alkyl group of 22 carbon atoms) | 65% by weight |
| methacrylic acid | 25% by weight |
| 2-hydroxyethyl methacrylate | 10% by weight |

Coating Liquids A1 and B3 were mixed in a solid weight ratio of 25/75 (Coating Liquid A1/Coating Liquid B3), and the mixture was aged at room temperature for 5 days (the product is shortly named Aged Coating Liquid 5). Aged Coating Liquid 5 and Coating Liquid C1 were then mixed in a solid weight ratio of 100/5 (Aged Coating Liquid 5/Coating Liquid C1) to form an laminated layer-forming coating liquid. The results are shown in Tables 5 and 6. The laminated film had very poor releasability.

Comparative Example 13

A laminated PET film was obtained using the process of Comparative Example 12, except that PET pellets containing 0.06% by weight of silica particles with an average particle size of 1.5 μm (intrinsic viscosity: 0.63 dl/g) and the laminated layer-forming coating liquid shown below were used instead and that the thickness of the PET film was set at 16 μm.

Laminated Layer-Forming Coating Liquid

Coating Liquids A1, B3 and C1 used were the same as those in Comparative Example 12.

Coating Liquids A1 and B3 were mixed in a solid weight ratio of 40/60 (Coating Liquid A1/Coating Liquid B3), and the mixture was aged at room temperature for 5 days (the product is shortly named Aged Coating Liquid 6). Aged Coating Liquid 6 and Coating Liquid C1 were then mixed in a solid weight ratio of 100/10 (Aged Coating Liquid 6/Coating Liquid C1) to form an laminated layer-forming coating liquid. The results are shown in Tables 5 and 6. The laminated film had poor releasability.

Comparative Example 14

An electrically-conductive metal oxide layer of a 150 nm-thick ITO (indium tin oxide) film was formed on the untreated surface of a biaxially-oriented polyester film (Lumirror U35 manufactured by Toray Industries, Inc.) by DC magnetron sputtering. The results are shown in Tables 5 and 6, in which glossiness is excellent, but releasability is very poor. This process requires high vacuum, has difficulty in continuously forming a film, and is very disadvantageous in terms of cost.

TABLE 5

| | Composition of Laminated layer | | Number of Carbon Atoms in Long Chain Alkyl | Surface Roughness of Laminated layer Side | |
|---|---|---|---|---|---|
| | Type | Solid Weight Ratio | | SRa (nm) | SRz (nm) |
| Example 21 | A1/B3/C2 | 25/75/20 | 18 | 14 | 510 |
| Example 22 | A1/B3/C1 | 40/60/15 | 22 | 8 | 230 |
| Example 23 | A1/B3/C1 | 25/75/20 | 22 | 8 | 230 |
| Example 24 | A1/B3/C1 | 25/75/40 | 22 | 8 | 230 |
| Example 25 | A1/B3/C1 | 25/75/100 | 22 | 8 | 230 |
| Example 26 | A1/B3/C6 | 25/75/20 | 22 | 6 | 70 |
| Example 27 | A1/B3/C2 | 25/75/30 | 18 | 6 | 70 |
| Example 28 | A1/B1/C1 | 25/75/20 | 22 | 6 | 70 |
| Example 29 | A1/B1/C1 | 25/75/20 | 22 | 6 | 70 |
| Example 30 | A1/B3/C1 | 25/75/20 | 22 | 18 | 600 |
| Comparative Example 9 | E1/F1 | 20/80 | (None) | 14 | 510 |
| Comparative Example 10 | A1/B3/G1 | 25/75/20 | 8 | 14 | 510 |
| Comparative Example 11 | A1/B3/G2 | 25/75/20 | 12 | 14 | 510 |
| Comparative Example 12 | A1/B3/C1 | 25/75/5 | 22 | 8 | 230 |
| Comparative Example 13 | A1/B3/C1 | 40/60/10 | 22 | 8 | 230 |
| Comparative Example 14 | Sputtered ITO Film | | | 1 | 5 |

TABLE 6

| | Conductivity (Ω/□) | Water Resistance (Ω/□) | Contact Angle with Water Droplet (degrees) | Glossiness | Oligomer Precipitation-Preventing Properties (mg/m$^2$) | Internal Contaminants of at Least 100 μm (/m$^2$) |
|---|---|---|---|---|---|---|
| Example 21 | $7 \times 10^4$ | $7 \times 10^4$ | 97 | Excellent | 1.0 | 2 |
| Example 22 | $1 \times 10^4$ | $1 \times 10^4$ | 95 | Excellent | 1.0 | 2 |
| Example 23 | $4 \times 10^4$ | $4 \times 10^4$ | 100 | Excellent | 0.5 | 2 |
| Example 24 | $1 \times 10^5$ | $1 \times 10^5$ | 103 | Excellent | 0.3 | 2 |
| Example 25 | $1 \times 10^6$ | $1 \times 10^6$ | 105 | Excellent | 0.3 | 2 |
| Example 26 | $4 \times 10^4$ | $4 \times 10^4$ | 99 | Excellent | 0.5 | 0 |
| Example 27 | $7 \times 10^4$ | $7 \times 10^4$ | 100 | Excellent | 0.5 | 0 |
| Example 28 | $5 \times 10^4$ | $5 \times 10^4$ | 100 | Excellent | 0.4 | 0 |
| Example 29 | $5 \times 10^4$ | $5 \times 10^4$ | 100 | Excellent | 0.4 | 0 |
| Example 30 | $7 \times 10^4$ | $7 \times 10^4$ | 99 | Good | 0.7 | 2 |
| Comparative Example 9 | $1 \times 10^{10}$ | $5 \times 10^{12}$ | 50 | Excellent | 0.7 | 2 |
| Comparative Example 10 | $7 \times 10^4$ | $8 \times 10^4$ | 65 | Excellent | 5.0 | 2 |
| Comparative Example 11 | $8 \times 10^4$ | $1 \times 10^5$ | 90 | Excellent | 1.5 | 2 |
| Comparative Example 12 | $4 \times 10^4$ | $6 \times 10^4$ | 81 | Excellent | 2.0 | 2 |
| Comparative Example 13 | $1 \times 10^4$ | $1 \times 10^4$ | 93 | Excellent | 1.2 | 2 |
| Comparative Example 14 | 80 | 80 | 60 | Excellent | 0.2 | 2 |

Industrial Applicability

The laminated film has high level of electrical conductivity, good releasability and good water resistance, and also has oligomer precipitation-preventing properties during heating. Thus, the laminated film can well function as a process film for surface protection in the field of optical components, and thus is useful. For example, the laminated film is useful as a polarizing plate-protective laminated film, which is used for surface protection in the working or implementation of polarizing plates for liquid crystal televisions, car navigation displays, cellular phone liquid crystal displays, computer displays, and the like.

The laminated film has high level of electrical conductivity, good releasability, good water resistance, and high glossiness, and also has oligomer precipitation-preventing properties during heating. Thus, the laminated film can well function as a process film for transfer or the like in the field of optical components, and thus is useful. For example, the laminated film is useful as a transfer foil, which is used for a hot stamping foil process for performing direct thermal transfer to molded components, an in-mold transfer process for performing injection molding and transfer printing at the same time, a vacuum press transfer process including the steps of reducing the air pressure between a transfer film and a molded component and then performing transfer printing by pressing and heating, and the like. The laminated film is also useful as a transfer film having a release function for a peeling process, a solution casting process or the like for transferring optical components to be used.

The invention claimed is:

1. A laminated film comprising a thermoplastic resin film and a laminated layer formed on at least one side of the thermoplastic resin film and comprises a composition (A), an epoxy crosslinking agent (B) and an acrylic resin (C) having an alkyl chain of 18 to 22 carbon atoms, wherein the composition (A) contains at least a poly-3,4-ethylenedioxythiophene and a polyanion and/or a composition containing a poly-3,4-ethylenedioxythiophene derivative and a polyanion, the laminated layer contains 20 to 100 parts by weight of the acrylic resin (C) having an alkyl chain of 18 to 22 carbon atoms based on 100 parts by weight of the sum of the composition (A) and the crosslinking agent (B) and/or a reaction product thereof, at least one side of the laminated film has a three-dimensional average surface roughness (SRa) of 3 nm to 50 nm, and the laminated film contains internal contaminant particles with an average particle size of at least 100 μm less than 10 per m$^2$.

2. The laminated film according to claim 1, wherein the weight ratio of the solids of the sum of the epoxy crosslinking agent (B) and/or a reaction product thereof to the solids of the composition (A) and the epoxy crosslinking agent (B) and/or a reaction product thereof is from 50% by weight to 95% by weight.

3. The laminated film according to claim 1, wherein the laminated layer contains 20 to 40 parts by weight of the acrylic resin (C) having an alkyl chain of 18 to 22 carbon atoms based on 100 parts by weight of the sum of the composition (A) and the crosslinking agent (B) and/or a reaction product thereof.

4. The laminated film according to claim 1, wherein the laminated film has a haze of at most 5%.

5. The laminated film according to claim 1, wherein the laminated film has a three-dimensional average surface roughness of 10 points (SRz) of at most 1000 nm.

6. The laminated film according to claim 1, wherein at least one side of the laminated film has a three-dimensional average surface roughness of 10 points (SRz) of at most 500 nm.

7. The laminated film according to claim 1, wherein the three-dimensional average surface roughness (SRa) is from 3 nm to 15 nm.

8. The laminated film according to claim 1, wherein the electrical conductivity of the laminated layer is from $1 \times 10^3$ Ω/□ to $1 \times 10^7$ Ω/□.

9. The laminated film according to claim 1, wherein with respect to variations in cross-sectional thickness measured in the transverse direction (TD) of the laminated film, the number of portions of the film with a variation in thickness of at least 0.3 μm is at most 5 per 1 m when the thickness variation is measured per 3 cm along the TD.

10. The laminated film according to claim 1, wherein the number of deposited contaminant particles of at least 100 μm less than 10 per m².

11. The laminated film according to claim 1, wherein a titanium compound is used as a resin polymerization catalyst for the thermoplastic resin film.

12. The laminated film according to claim 1, wherein it is produced by simultaneous biaxial stretching.

13. The laminated film according to claim 1, further comprising a pressure-sensitive adhesive layer formed on at least one side of the laminated film.

14. The laminated film according to claim 1, further comprising a pressure-sensitive adhesive layer formed on a side opposite to the side where the laminated layer is formed.

15. The laminated film according to claim 1, wherein the thermoplastic resin film is a polyethylene terephthalate film or a polyethylene-2,6-naphthalate film.

16. The laminated film according to claim 1, wherein it is a polarizing plate-protective film.

17. The laminated film according to claim 1, wherein it is a transfer film.

18. The laminated film according to claim 17, wherein the three-dimensional average surface roughness (SRa) is from 3 nm to 10 nm.

19. The laminated film according to claim 17, wherein it is for use in a transfer foil.

20. The laminated film according to claim 19, wherein a side opposite to the side where the laminated layer is formed has a three-dimensional average surface roughness (SRa) of 3 nm to 15 nm.

21. The laminated film according to claim 1, further comprising a layer that is made of at least one selected from a polyester resin, a urethane resin and an acrylic resin formed on the side of the laminated film opposite to the side where the laminated layer is formed.

22. The laminated film according to claim 1, wherein the laminated layer has a thickness of 0.005 to 0.2 μm.

* * * * *